(12) United States Patent
Mostafa et al.

(10) Patent No.: US 11,527,107 B1
(45) Date of Patent: Dec. 13, 2022

(54) ON THE FLY ENROLLMENT FOR FACIAL RECOGNITION

(71) Applicant: Apple Inc., Cupertino, CA (US)

(72) Inventors: Eslam A. Mostafa, Sunnyvale, CA (US); Kelsey Y. Ho, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 748 days.

(21) Appl. No.: 16/457,811

(22) Filed: Jun. 28, 2019

Related U.S. Application Data

(60) Provisional application No. 62/692,423, filed on Jun. 29, 2018.

(51) Int. Cl.
*G06V 40/16* (2022.01)
*G06N 3/04* (2006.01)
(Continued)

(52) U.S. Cl.
CPC ............ *G06V 40/172* (2022.01); *G06F 21/32* (2013.01); *G06K 9/6262* (2013.01);
(Continued)

(58) Field of Classification Search
USPC ........ 713/171, 150, 163, 181; 726/2, 19, 21, 726/36; 380/255, 264, 276
See application file for complete search history.

(56) References Cited

U.S. PATENT DOCUMENTS

| 32,017 A | * | 4/1861 | Turner et al. | ............. | B07B 1/38 |
| | | | | | 209/365.2 |
| 32,019 A | * | 4/1861 | Walker et al. | ............. | C10B 1/04 |
| | | | | | 202/217 |

(Continued)

FOREIGN PATENT DOCUMENTS

| CN | 106156702 A | 11/2016 |
| EP | 3147827 A1 | 3/2017 |

OTHER PUBLICATIONS

C. Pagano, E. Granger, R. Sabourin, P. Tuveri, G.L. Marcialis and F. Roli; "Context-Sensitive Self-Updating for Adaptive Face Recognition;"Oct. 22, 2015; ProQuest (Technology Collection Database, Dissertations and Theses Database): Technical Literature Search; https://www.springer.com/cda/content/document/cda . . . /9783319248639-c2.pdf?; 27 pages.

*Primary Examiner* — Sharif E Ullah

(74) *Attorney, Agent, or Firm* — Kowert, Hood, Munyon, Rankin & Goetzel, P.C.; Gareth M. Sampson

(57) ABSTRACT

When a software update is provided to a device that implements a facial recognition authentication process, a new authentication algorithm to operate the facial recognition authentication process may be included as part of software update. For a period of time, the new authentication algorithm may operate a "virtual" facial recognition authentication process alongside operation of the existing facial recognition authentication process using the existing (e.g., earlier version) authentication algorithm. The performance of the new authentication algorithm in providing facial recognition authentication (as assessed by the "virtual" process) may be compared to the performance of the existing authentication algorithm in providing facial recognition authentication during the period of time. When the performance of the new authentication algorithm is determined to have a satisfactory performance, operation of the actual facial recognition authentication process on the device may be switched to the new authentication algorithm.

6 Claims, 16 Drawing Sheets

(51) Int. Cl.
*G06F 21/32* (2013.01)
*G06K 9/62* (2022.01)
*G06V 10/75* (2022.01)
*G06V 40/50* (2022.01)

(52) U.S. Cl.
CPC ......... *G06N 3/0454* (2013.01); *G06V 10/751* (2022.01); *G06V 40/50* (2022.01)

(56) References Cited

U.S. PATENT DOCUMENTS

| | | | | |
|---|---|---|---|---|
| 42,013 A * | 3/1864 | Muzzey | ............... | B65D 90/026 217/4 |
| 42,016 A * | 3/1864 | Norton | ................... | A47D 1/106 297/174 CS |
| 42,018 A * | 3/1864 | Peak et al. | ......... | A61G 17/0076 27/5 |
| 52,018 A * | 1/1866 | Blinn | ........................ | E06B 9/24 160/133 |
| 62,014 A * | 2/1867 | Crum | ....................... | B68B 3/00 69/3 |
| 62,017 A * | 2/1867 | Davis | ..................... | A43B 13/34 36/40 |
| 72,016 A * | 12/1867 | Glass et al. | ............. | A01D 43/02 56/171 |
| 72,018 A * | 12/1867 | Goodwin | ............... | A01B 35/02 172/691 |
| 82,013 A * | 9/1868 | Lyman | ...................... | A01L 7/04 168/29 |
| 82,015 A * | 9/1868 | Mattson | ................... | A61M 1/06 604/75 |
| 82,017 A * | 9/1868 | McNeil | .................... | B21D 1/06 72/482.94 |
| 82,018 A * | 9/1868 | Metzler | .................. | A47C 11/00 297/244 |
| 102,015 A * | 4/1870 | King | ........................ | B66D 3/06 254/394 |
| 102,018 A * | 4/1870 | Krepps | .................... | B03B 9/061 202/168 |
| 112,018 A * | 2/1871 | Coffin | ...................... | F16L 59/12 138/147 |
| 122,015 A * | 12/1871 | Hemingray | ............. | C03B 19/04 65/316 |
| 122,017 A * | 12/1871 | Hollis | ...................... | D01G 7/04 19/80 R |
| 8,381,969 B1 * | 2/2013 | Miller | ...................... | G06Q 20/382 235/375 |
| 9,369,870 B2 * | 6/2016 | Varadarajan | .......... | H04W 12/08 |
| 11,113,510 B1 * | 9/2021 | Mostafa | .................. | G06F 21/32 |
| 2006/0059557 A1 * | 3/2006 | Markham | ............ | G08B 29/188 726/22 |
| 2006/0213982 A1 * | 9/2006 | Cannon | .................. | G07C 9/257 235/380 |
| 2007/0061590 A1 * | 3/2007 | Boye | ..................... | G06F 21/305 713/186 |
| 2008/0018451 A1 * | 1/2008 | Slibeck | .................. | G07C 9/257 340/552 |
| 2008/0162943 A1 * | 7/2008 | Ali | ........................ | H04L 9/3234 713/185 |
| 2008/0178008 A1 * | 7/2008 | Takahashi | ............... | G07C 9/257 713/186 |
| 2009/0183008 A1 * | 7/2009 | Jobmann | ................ | G06F 21/34 235/382 |
| 2010/0275258 A1 * | 10/2010 | Kamakura | ........... | G06K 9/6277 726/19 |
| 2011/0246817 A1 * | 10/2011 | Orsini | ..................... | H04L 63/08 714/E11.062 |
| 2012/0331557 A1 * | 12/2012 | Washington | ....... | G06Q 20/4016 726/26 |
| 2017/0351905 A1 * | 12/2017 | Wang | ................... | G06V 40/171 |
| 2018/0007060 A1 * | 1/2018 | Leblang | ............... | H04L 63/0861 |
| 2019/0036939 A1 * | 1/2019 | Johansson | ........... | G06F 21/6245 |
| 2019/0050866 A1 * | 2/2019 | Wang | ................... | G06Q 20/40145 |
| 2020/0257893 A1 * | 8/2020 | Trani | ................... | G06V 40/172 |

* cited by examiner

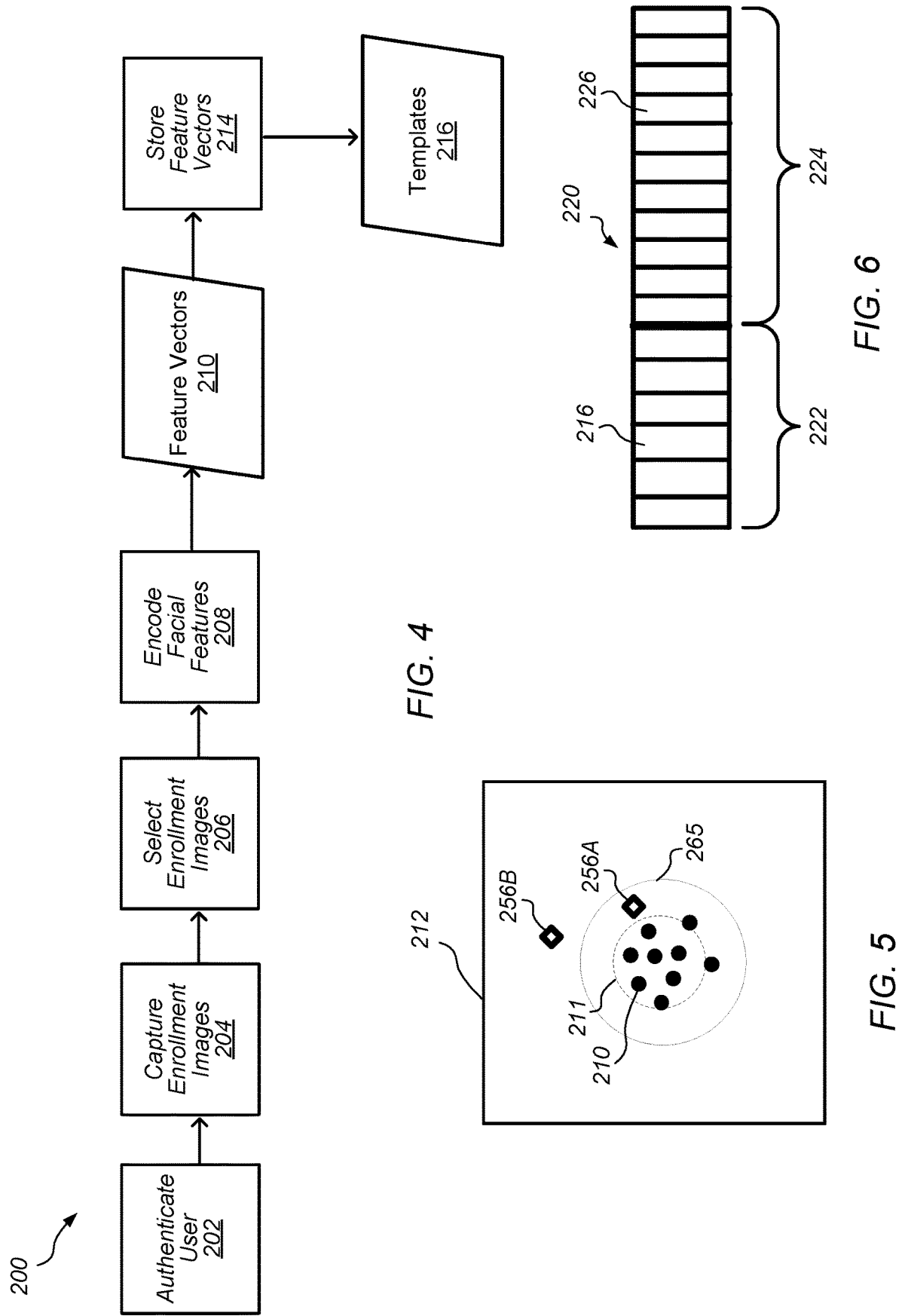

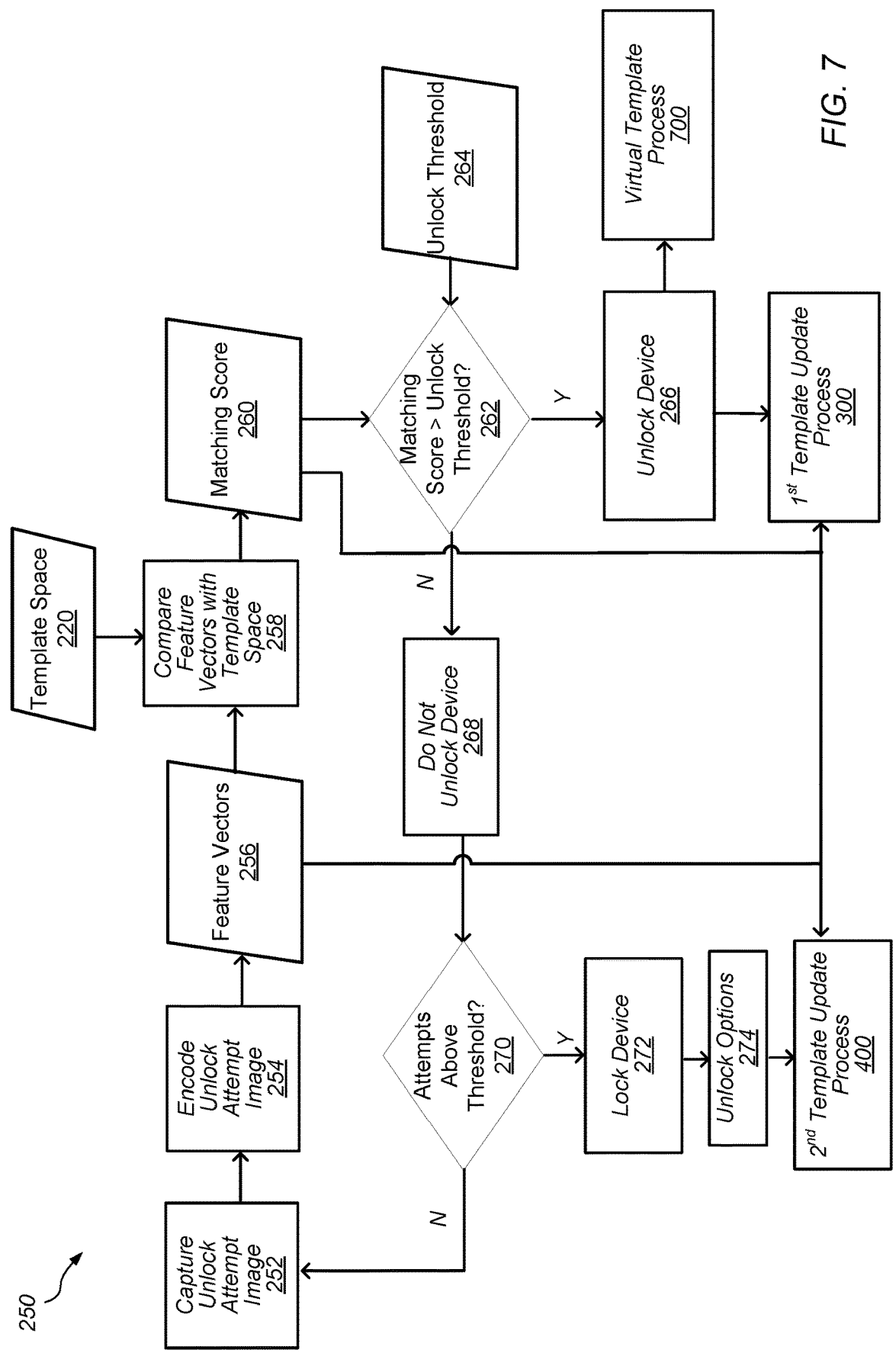

ON THE FLY ENROLLMENT FOR FACIAL RECOGNITION

PRIORITY CLAIM

This patent claims priority to U.S. Provisional Patent Application No. 62/692,423 to Ho et al., entitled "ON THE FLY ENROLLMENT FOR FACIAL RECOGNITION", filed Jun. 29, 2018, which is incorporated by reference in their entirety.

BACKGROUND

1. Technical Field

Embodiments described herein relate to methods and systems for face detection and recognition in images captured by a camera on a device. More particularly, embodiments described herein relate to the implementation of new neural networks used in face detection and recognition processes during use of the device.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

For authentication using facial recognition, an authorized user typically follows an enrollment protocol to register the user's face on the device for future unlocking of the device using facial recognition authentication. The enrollment protocol typically has the user follow a controlled regiment to capture the user's face in different poses and/or positions to generate enrollment data in order to provide the best possible experience for the user in unlocking the device. Some systems and/or devices may store the enrollment data as raw user data (e.g., raw data for images of the user is stored on the device). Storing raw user data for long term use as enrollment data may, however, be unsafe if information from the system or device is illegally accessed (e.g., stolen or hacked). To prevent these situations, certain systems and/or devices may store processed data as the enrollment data (e.g., data generated by processing images of the user as described herein). Storing processed data for enrollment data instead of raw user data may provide enhanced security for the user by eliminating the long term storage of raw user data on the device.

Software operating the facial recognition authentication on the device may often be updated as improvements in the models (e.g., neural networks) involved in the process are made. When software updates are implemented on the device, new enrollment data may need to be utilized with the new models due to the changes in operation of the device using the new models. For devices that utilize raw user data for enrollment data, the raw user data may be used to generate the new enrollment data. For devices that utilize processed data for enrollment data, however, a new enrollment profile may need to be generated for the new model. One solution to generate the new enrollment profile is for the user to go through the enrollment protocol again (e.g., reenroll on the device). Generating the new enrollment profile by reenrolling for a software update may, however, be cumbersome to the user, especially if the user has to update his/her enrollment profile with every new software update. Thus, there may be potential for the device to provide an even better user experience by providing methods for seamlessly transitioning template information from the currently operation version of the model to the updated (new) model.

SUMMARY

After a new neural network (e.g., a neural network module or model) is added to a processor on a device (e.g., after a software update on the processor), the new neural network may, for a time, operate a "virtual" facial recognition authentication process alongside the current facial recognition authentication process being operated by the current version of the neural network. The current version of the neural network may be used for actual unlocking of the device using the current facial recognition authentication process during this time. The new neural network may operate the "virtual" facial recognition authentication process using a template generated from images that successfully unlock the device using the current neural network. After a period of time, the performance of the new neural network in providing facial recognition authentication may be compared to the performance of the current neural network in providing facial recognition authentication. Comparison of the performances may be used to determine if operation of the device may be switched to the new neural network.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which:

FIG. 4 depicts a flowchart of an embodiment of an image enrollment process for an authorized user of a device.

FIG. 5 depicts a representation of an embodiment of a feature space with feature vectors after an enrollment process.

FIG. 6 depicts a representation of an embodiment of a template space for an enrollment profile in a memory of a device.

FIG. 7 depicts a flowchart of an embodiment of a facial recognition authentication process.

Figure 1:
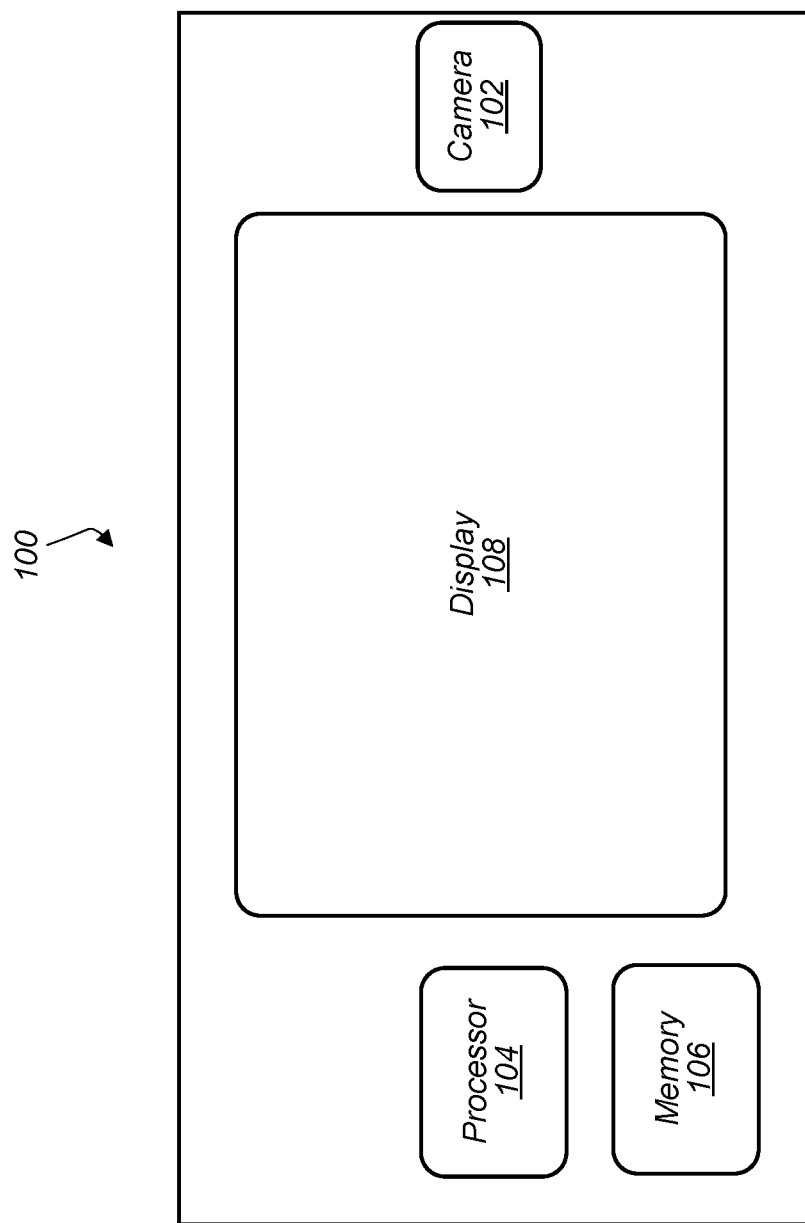
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
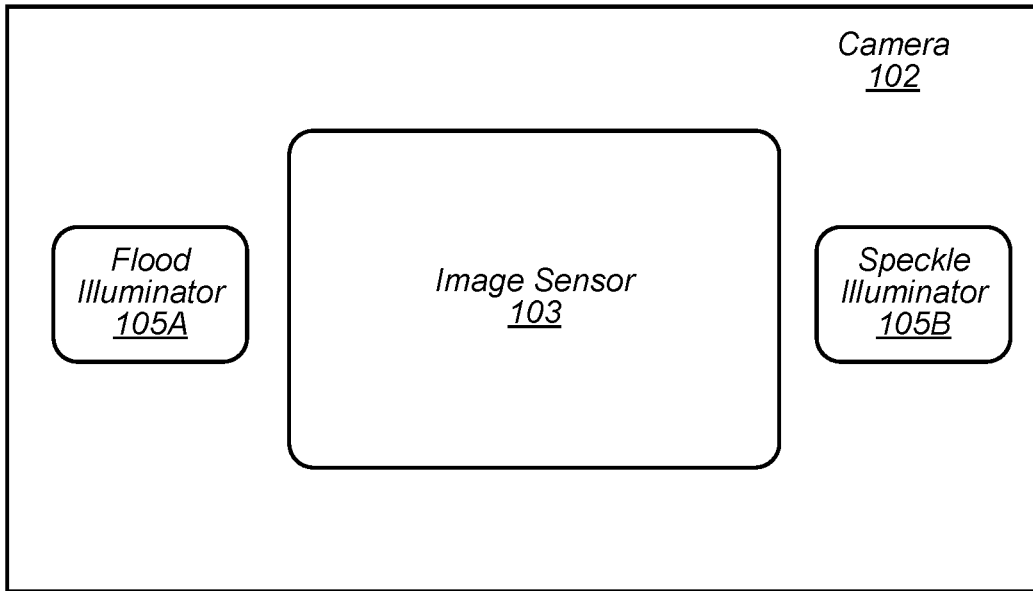
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a pattern (speckle pattern) projector). In some embodiments, the flood IR source and pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light.

Depth information may be captured using any suitable depth imaging system, examples of which include structured light and time of flight systems. In some instances, the depth imaging system may utilize an illuminator in providing depth detection or generating a depth map image. For example, illuminator 105B may provide IR illumination with a pattern (e.g., patterned infrared (IR) illumination). The pattern may be a pattern of light with a known, and controllable, configuration and pattern projected onto a subject (e.g., a structured pattern of light). In certain embodiments, the pattern is a speckle pattern (e.g., a pattern of dots). The pattern may, however, include any structured or semi-structured pattern of light features. For example, the pattern may include, but not be limited to, dots, speckles, stripes, dashes, nodes, edges, and combinations thereof.

Illuminator 105B may include a VCSEL array configured to form the pattern or a light source and patterned transparency configured to form the pattern. The configuration and pattern of the pattern provided by illuminator 105B may be selected, for example, based on a desired pattern density (e.g., speckle or dot density) at the subject. Image sensor 103 may capture images of the subject illuminated by the pattern. The captured image of the pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Pat. Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
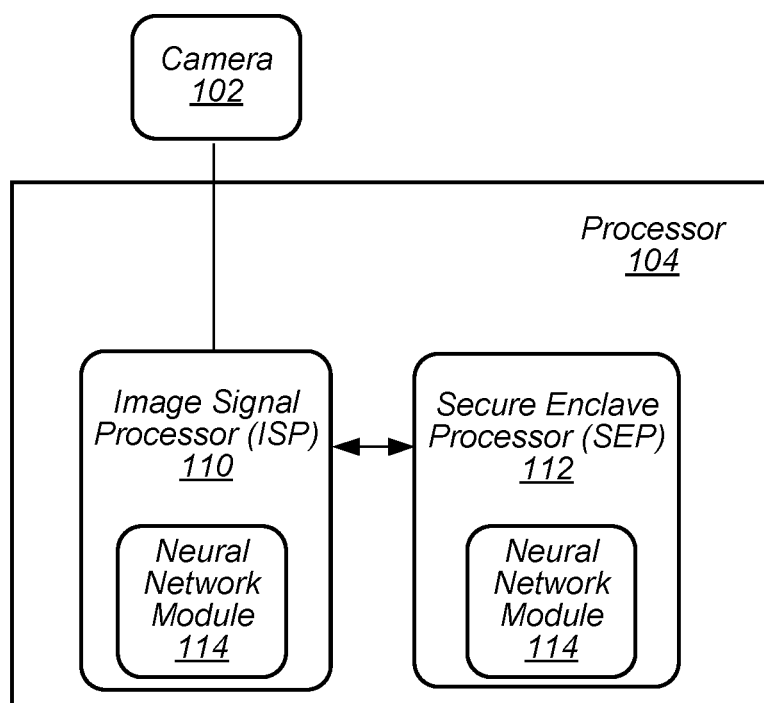
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., image enrollment process 200, as shown in FIG. 4, or a registration process) to capture images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process (e.g., first template update process 300 and/or second template update process 400 described herein) may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a patterned illumination image used to generate a depth map image). In certain embodiments, ISP 110 and/or SEP 112 process the flood IR images and patterned illumination images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and patterned illumination images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and patterned illumination image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

FIG. 4 depicts a flowchart of an embodiment of image enrollment process 200 for an authorized user of device 100. Process 200 may be used to create an enrollment profile for an authorized user of device 100 that is stored in the device (e.g., in a memory coupled to SEP 112). The enrollment profile may include one or more templates for the authorized user created using process 200. The enrollment profile and the templates associated with the enrollment profile may be used in a facial recognition process to allow (e.g., authorize) the user to use the device and/or perform operations on the device (e.g., unlock the device).

In certain embodiments, process 200 is used when device 100 is used a first time by the authorized user and/or when the user opts to create an enrollment profile for a facial recognition process. For example, process 200 may be initiated when device 100 is first obtained by the authorized user (e.g., purchased by the authorized user) and turned on for the first time by the authorized user. In some embodiments, process 200 may be initiated by the authorized user when the user desires to enroll in a facial recognition process, update security settings for device 100, re-enroll, and/or add an enrollment profile on the device.

In certain embodiments, process 200 begins with authenticating the user in 202. In 202, the user may be authenticated on device 100 using a non-facial authentication process. For example, the user may be authenticated as an authorized user by entering a passcode, entering a password, or using another user authentication protocol other than facial recognition. After the user is authenticated in 202, one or more enrollment (e.g., reference or registration) images of the user are captured in 204. The enrollment images may include images of the user illuminated by flood illuminator 105A (e.g., flood IR images) and/or images of the user illuminated by illuminator 105B (e.g., patterned illumination images). As described herein, flood IR images and patterned illumination images may be used independently and/or in combination in facial recognition processes on device 100 (e.g. the images may independently be used to provide an authentication decision and the decisions may be combined to determine a final decision on user authentication).

The enrollment images may be captured using camera 102 as the user interacts with device 100. For example, the enrollment images may be captured as the user follows prompts on display 108 of device 100. The prompts may include instructions for the user to make different motions and/or poses while the enrollment images are being captured. During 204, camera 102 may capture multiple images for each motion and/or pose performed by the user. Capturing images for different motions and/or different poses of the user where the images still have a relatively clear depiction of the user may be useful in providing a better variety of enrollment images that enable the user to be authenticated without having to be in a limited or restricted position relative to camera 102 on device 100.

After the multiple enrollment images are captured in 204, selection of enrollment images for further image processing may be made in 206. Selection of enrollment images 206, and further processing of the images, may be performed by ISP 110 and/or SEP 112. Selection of enrollment images for further processing may include selecting images that are suitable for generating templates. For example, the selection of images that are suitable for use generating templates in 206 may include assessing one or more selected criteria for the images and selecting images that meet the selected criteria. The selected images may be used to generate templates for the user. Selected criteria may include, but not be limited to, the face of the user being in the field of view of the camera, a pose of the user's face being proper (e.g., the user's face is not turned too far in any direction from the camera (i.e., the pitch, yaw, and/or roll of the face are not above certain levels), a distance between camera 102 and the face of the user being in a selected distance range, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, if more than one face is detected in an enrollment image, the enrollment image is rejected and not used (e.g., not selected) for further processing. Selection of images suitable for further processing may be rule based on the images meeting a certain number of the selected criteria or all of the selected criteria. In some embodiments, occlusion maps and/or landmark feature maps are used in identifying features of the user (e.g., facial features such as eyes, nose, and mouth) in the images and assessing the selected criteria in the images.

After images are selected in 206, features of the user in the selected (template) images may be encoded in 208. Encoding of the selected images may include encoding features (e.g., facial features) of the user to define the features in the images as one or more feature vectors in a feature space. Feature vectors 210 may be the output of the encoding in 208. A feature space may be an n-dimensional feature space. A feature vector may be an n-dimensional vector of numerical values that define features from the image in the feature space (e.g., the feature vector may be a vector of numerical values that define facial features of the user in the image).

FIG. 5 depicts a representation of an embodiment of feature space 212 with feature vectors 210. Each feature vector 210 (black dot) may define facial features for the user from either a single image, from a composite image (e.g., an image that is a composite of several images), or from multiple images. As feature vectors 210 are generated from a single user's facial features, the feature vectors may be similar to one another because the feature vectors are associated with the same person and may have some "clustering", as shown by circle 211 in FIG. 5. Feature vectors 256A and 256B (open diamonds) are feature vectors obtained from facial recognition process 250, described below.

As shown in FIG. 4, process 200 may include, in 214, storing feature vectors 210 in a memory of device 100 (e.g., a memory protected by SEP 112). In certain embodiments, feature vectors 210 are stored as static templates 216 (e.g., enrollment templates or reference templates) in a template space of the memory (e.g., template space 220 described below). Static templates 216 may be used for the enrollment profile created by process 200. In some embodiments, static templates 216 (and other templates described herein) include separate templates for feature vectors obtained from the enrollment flood IR images and for feature vectors obtained from the enrollment patterned illumination images. It is to be understood that the separate templates obtained from flood IR images and patterned illumination images (e.g., images used to generate depth map images) may be used independently and/or in combination during additional processes described herein. For simplicity in this disclosure, static templates 216 are described generically and it should be understood that static templates 216 (and the use of the templates) may refer to either templates obtained from flood IR images or templates obtained from patterned illumination images. In some embodiments, a combination of the flood IR images and patterned illumination images may be used to generate templates. For example, pairs of feature vectors obtained from flood IR images and patterned illumination images may be stored in static templates 216 to be used in one or more facial recognition processes on device 100.

FIG. 6 depicts a representation of an embodiment of template space 220 for an enrollment profile in memory 106 of device 100. In certain embodiments, template space 220 is located in a portion of memory 106 of device 100 protected by SEP 112. In some embodiments, template space 220 includes static portion 222 and dynamic portion 224. Static templates 216 may be, for example, added to static portion 222 of template space 220 (e.g., the templates are permanently added to the memory and are not deleted or changed unless the device is reset). In some embodiments, static portion 222 includes a certain number of static templates 216. For example, for the embodiment of template space 220 depicted in FIG. 6, six static templates 216 are allowed in static portion 222. In some embodiments, nine static templates 216 may be allowed in static portion 222. Other numbers of static templates 216 in static portion 222 may also be contemplated. After the enrollment process for the enrollment profile is completed and static templates 216 are added to static portion 222, additional dynamic templates 226 may be added to dynamic portion 224 of template space 220 for the enrollment profile (e.g., a portion from which templates may be added and deleted without a device reset being needed).

Static templates 216 may thus be enrollment templates (or reference templates) generated by enrollment process 200 for the enrollment profile associated with the enrollment process. After enrollment process 200 is completed, a selected number of static templates 216 are stored in static portion 222 of template space 220 for the enrollment profile. The number of static templates 216 stored in static portion 222 after enrollment process 200 may vary depending on, for example, the number of different feature vectors obtained during the enrollment process, which may be based on the number of images selected to be suitable for use as template images, or a desired number of templates for the device. After enrollment process 200, static templates 216 include feature vectors 210 (e.g., the enrollment or reference feature vectors) that can be used for facial recognition of the authorized user associated with the enrollment profile. Thus, template space 220 may be used in a facial recognition authentication process to authorize the user associated with the enrollment profile.

FIG. 7 depicts a flowchart of an embodiment of facial recognition authentication process 250. Process 250 may be used to authenticate a user as an authorized user of device 100 using facial recognition of the user. In certain embodiments, process 250 is used to authenticate a user using an enrollment profile (e.g., template space 220) on device 100. Authentication of the authorized user may allow the user to access and use device 100 (e.g., unlock the device) and/or have access to a selected functionality of the device (e.g., unlocking a function of an application running on the device, payment systems (i.e., making a payment), access to personal data, expanded view of notifications, etc.). In certain embodiments, process 250 is used as a primary biometric authentication process for device 100 (after enrollment of the authorized user). In some embodiments, process 250 is used as an authentication process in addition to another authentication process (e.g., fingerprint authentication, another biometric authentication, passcode entry, password entry, and/or pattern entry). In some embodiments, another authentication process (e.g., passcode entry, pattern entry, other biometric authentication) may be used to access device 100 if the user fails to be authenticated using process 250.

In 252, camera 102 captures an image of the face of the user attempting to be authenticated for access to device 100 (e.g., the camera captures an "unlock attempt" image of the user). It is to be understood that the unlock attempt image may be a single image of the face of the user (e.g., a single flood IR image or single patterned illumination image) or the unlock attempt image may be a series of several images of the face of the user taken over a short period of time (e.g., one second or less). In some embodiments, the series of several images of the face of the user includes pairs of flood IR images and patterned illumination images (e.g., pairs of consecutive flood IR and patterned illumination images). In some implementations, the unlock attempt image may be a composite of several images of the user illuminated by the flood illuminator and the pattern illuminator.

Camera 102 may capture the unlock attempt image in response to a prompt by the user or a user generated request. For example, the unlock attempt image may be captured when the user attempts to access device 100 by pressing a button (e.g., a home button or virtual button) on device 100, by moving the device into a selected position relative to the user's face (e.g., the user moves the device such that the camera is pointed at the user's face or lifting the device from a table), and/or by making a specific gesture or movement with respect to the device (e.g., tapping on the screen, swiping the user's finger across the display, or picking the device off the table). It is to be understood that, as described herein, unlock attempt images may include either flood IR images or patterned illumination images, or a combination thereof. Further, the unlock attempt images may be processed in association with their corresponding template (e.g., flood IR images with a template for flood IR enrollment images) independently or in combination as needed.

Additionally, unlock attempt images may include images that have been processed using a face detection process to determine and locate one or more faces in the images. Images that are further processed in process 250 (e.g., encoded in 254) may include only images in which at least one face has been detected. If no face is detected in an unlock attempt image, the unlock attempt image may be discarded and additional unlock attempt images may be captured (either automatically or after user input) until a face is detected in the captured unlock attempt images. Examples of face detection processes are described in U.S. patent application Ser. No. 15/910,551 to Gernoth et al. and U.S. patent application Ser. No. 16/119,842 to Kumar et al., which are incorporated by reference as if fully set forth herein.

In 254, the unlock attempt image is encoded to define the facial features of the user as one or more feature vectors in the feature space. In some embodiments, one feature vector is defined for the unlock attempt image. In some embodiments, multiple feature vectors are defined for the unlock attempt image. Unlock feature vector(s) 256 may be the output of the encoding of the unlock attempt image in 254.

In certain embodiments, in 258, unlock feature vector(s) 256 are compared to feature vectors in the templates of template space 220 to get matching score 260 for the unlock attempt image. In certain embodiments, template space 220 is the template space for an enrollment profile on device 100. Matching score 260 may be a score of the differences between feature vector(s) 256 and feature vectors in template space 220 (e.g., feature vectors in static templates 216 and/or other dynamic templates 226 added to the template space as described herein). The closer (e.g., the less distance or less differences) that feature vector(s) 256 and the feature vectors in template space 220 are, the higher matching score 260 may be. For example, as shown in FIG. 5, feature vector 256A (open diamond) is closer to feature vectors 210 than feature vector 256B (open diamond)(e.g., feature vector 256B is a further outlier than feature vector 256A). Thus, feature vector 256A would have a higher matching score than feature vector 256B. As feature vector 256B is further away from feature vectors 210 than feature vector 256A, the lower matching score for feature vector 256B means less confidence that the face in the unlock attempt image associated with feature vector 256B is the face of the authorized user associated with the enrollment profile and template space 220.

In some embodiments, comparing feature vector(s) 256 and templates from template space 220 to get matching score 260 includes using one or more classifiers or a classification-enabled network to classify and evaluate the differences between feature vector(s) 256 and templates from template space 220. Examples of different classifiers that may be used include, but are not limited to, linear, piecewise linear, nonlinear classifiers, support vector machines, and neural network classifiers. In some embodiments, matching score 260 is assessed using distance scores between feature vector(s) 256 and templates from template space 220.

In 262, matching score 260 is compared to unlock threshold 264 for device 100. Unlock threshold 264 may represent a minimum difference (e.g., distance in the feature space) in features (as defined by feature vectors) between the face of the authorized user and the face of the user in the unlock attempt image that device 100 requires in order to unlock the device (or unlock a feature on the device). For example, unlock threshold 264 may be a threshold value that determines whether the unlock feature vectors (e.g., feature vectors 256) are similar enough (e.g., close enough) to the templates associated with the authorized user's face (e.g., static templates 216 in template space 220). As further example, unlock threshold 264 may be represented by circle 265 in feature space 212, depicted in FIG. 5. As shown in FIG. 5, feature vector 256A is inside circle 265 and thus feature vector 256A would have matching score 260 above unlock threshold 264. Feature vector 256B, however, is outside circle 265 and thus feature vector 256B would have matching score 260 below unlock threshold 264. In certain embodiments, unlock threshold 264 is set during manufacturing and/or by the firmware of device 100. In some embodiments, unlock threshold 264 is updated (e.g., adjusted) by device 100 during operation of the device as described herein.

As shown in FIG. 7, in 262, if matching score 260 is above unlock threshold 264 (i.e., the user's face in the unlock attempt image substantially matches the face of the authorized user), the user in the unlock attempt image is authenticated as the authorized user for the enrollment profile on device 100 and the device is unlocked in 266. In some embodiments, after device 100 is unlocked in 266, unlock feature vectors 256 are provided to "virtual" template process 700, shown in FIG. 8. In certain embodiments, after device 100 is unlocked in 266, unlock feature vectors 256 and matching score 260 are provided to first template update process 300, shown in FIG. 15, which may add or replace templates in template space 220.

In 262, if matching score 260 is below unlock threshold 264 (e.g., not equal to or above the unlock threshold), then device 100 is not unlocked in 268 (e.g., the device remains locked). It should be noted that device 100 may be either locked or unlocked if matching score 260 is equal to unlock threshold 264 depending on a desired setting for the unlock threshold (e.g., tighter or looser restrictions). Additionally, either option for an equal matching score comparison may be also applied as desired for other embodiments described herein.

In certain embodiments, the unlock attempts are compared to a threshold in 270. The threshold may be, for example, a maximum number of unlock attempts allowed or a maximum allotted time for unlock attempts. In certain embodiments, a number of unlock attempts is counted (e.g., the number of attempts to unlock device 100 with a different unlock attempt image captured in 252) and compared to the maximum number of unlock attempts allowed.

In certain embodiments, if the unlock attempts reaches the threshold (e.g., number of unlock attempts reaches the maximum number of attempts allowed), then device 100 is locked from further attempts to use facial authentication in 272. In some embodiments, when the device is locked in 272, an error message may be displayed (e.g., on display 108) indicating that facial recognition authentication process 250 has failed and/or the desired operation of device 100 is restricted or prevented from being performed. Device 100 may be locked from further attempts to use facial authentication in 272 for a specified period of time and/or until another authentication protocol is used to unlock the device. For example, unlock options 274 may be used to unlock device 100.

Unlock options 274 may include the user being presented with one or more options for proceeding with a different type of authentication to unlock or access features on device 100 (e.g., the user is presented options for proceeding with a second authentication protocol). Presenting the options may include, for example, displaying one or more options on display 108 of device 100 and prompting the user through audible and/or visual communication to select one of the displayed options to proceed with unlocking the device or accessing features on the device. The user may then proceed with unlocking/accessing device 100 using the selected option and following additional audible and/or visual prompts as needed. After successfully being authenticated using the selected option, the user's initial request for unlocking/accessing device 100 may be granted. Unlock options 274 may include, but not be limited to, using a passcode, a password, pattern entry, a different form of biometric authentication, or another authentication protocol to unlock device 100. In some embodiments, unlock options 274 includes providing a "use passcode/password/pattern" affordance that, when selected causes display of a passcode/password/pattern entry user interface, or a passcode/password/pattern entry user interface, or a "use fingerprint" prompt that, when displayed, prompts the user to place a finger on a fingerprint sensor for the device. In some embodiments, after device 100 is unlocked using the unlock options in 274, unlock feature vectors 256 and matching score 260 are provided to second template update process 400, shown in FIG. 18.

If the unlock attempts are below the threshold in 270 (e.g., number of unlock attempts are below the maximum number of attempts allowed), then process 250 may be run again (re-initiated) beginning with a new unlock attempt image of the user being captured in 252. In some implementations, device 100 automatically captures the new unlock attempt image of the user's face without prompting the user (e.g., capturing of the new image is automatically implemented and/or hidden from the user). In some implementations, device 100 notifies the user (either visually and/or audibly) that process 250 is being re-initiated. In some embodiments, device 100 may prompt the user to provide input to re-initiate process 250. For example, the user may be prompted to acknowledge or otherwise confirm (either visually and/or audibly) the attempt to re-initiate process 250.

Figure 8:
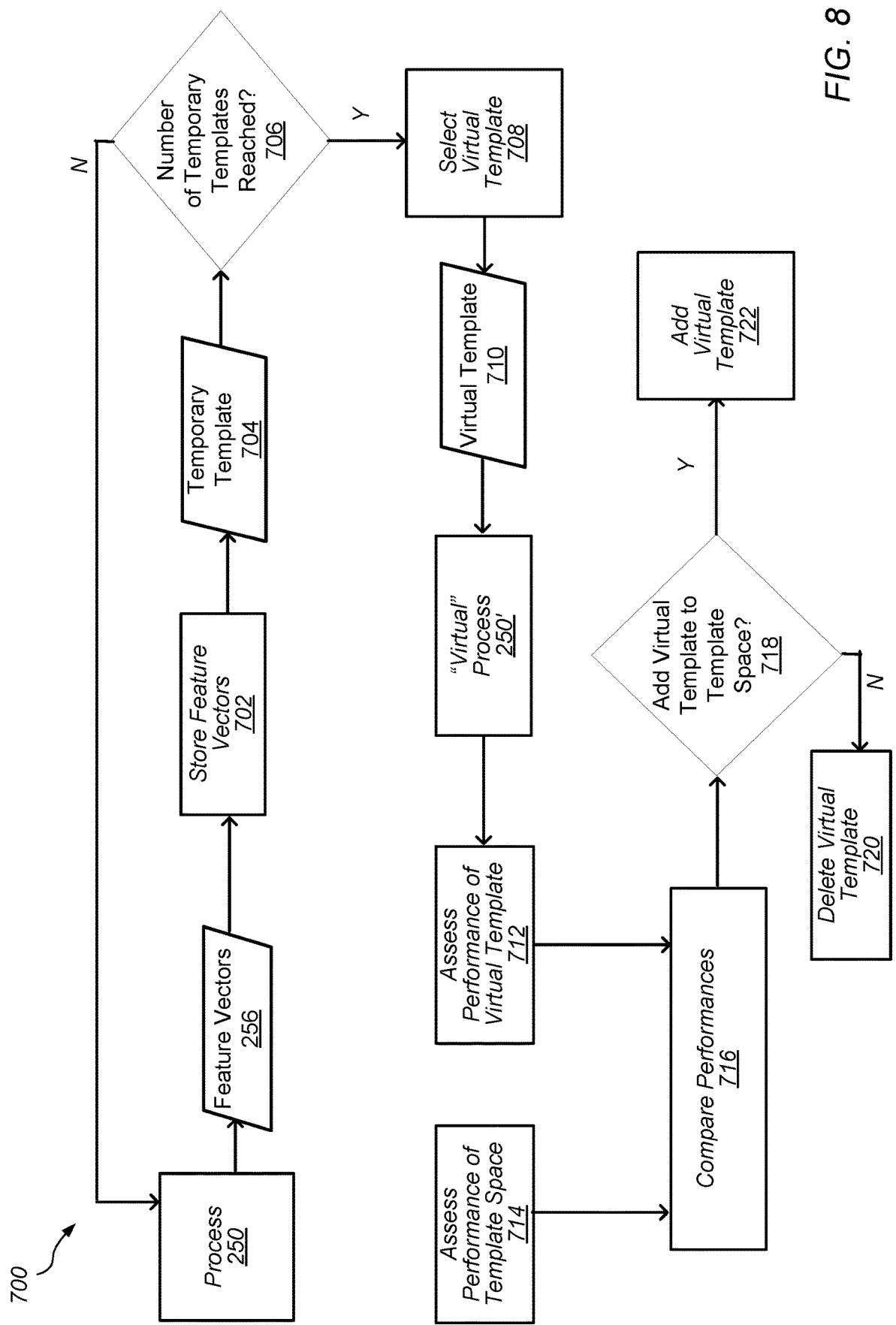
FIG. 8 depicts a flowchart of an embodiment of a "virtual" template process.

FIG. 8 depicts a flowchart of an embodiment of "virtual" template process 700. Process 700 may be used to add a "virtual" static template to template space 220. The virtual static template may be implemented into future operations of a facial recognition authentication process and the performance of the virtual static template may be assessed (e.g., monitored or tracked) during the future operations of the facial recognition authentication process.

Process 700 may begin with storing feature vector(s) 256 from process 250 in a space (e.g., a backup space) in the memory of device 100 in 702. Feature vector(s) 256 may be stored as temporary template 704. As feature vector(s) 256 are provided to process 700 after the feature vectors have matching score 260 above unlock threshold 264 (as shown in FIG. 7), temporary template 704 is generated from feature vectors that unlock device 100.

In 706, the number of temporary templates 704 stored in the memory device are counted and compared to a selected number of temporary templates (e.g., a threshold number of templates). The selected number of temporary templates may include a number of temporary templates suitable for a reasonable set of data (e.g., a number of templates that provides reasonable statistical results). In some embodiments, the selected number of temporary templates is a typical number of templates stored over a selected period of time (e.g., a number of templates typically stored over a number of days or a number of weeks).

If the number of temporary templates 704 is below the selected number in 706, then process 250 is operated again and additional feature vector(s) 256 from successful unlock attempts are added to generate additional temporary templates until the selected number is reached. Once the selected number of temporary templates 704 is reached in 706, process 700 may continue with selecting a temporary template in 708. Selecting the temporary template in 708 may include selecting the "virtual" template 710 for process 700.

Figure 9:
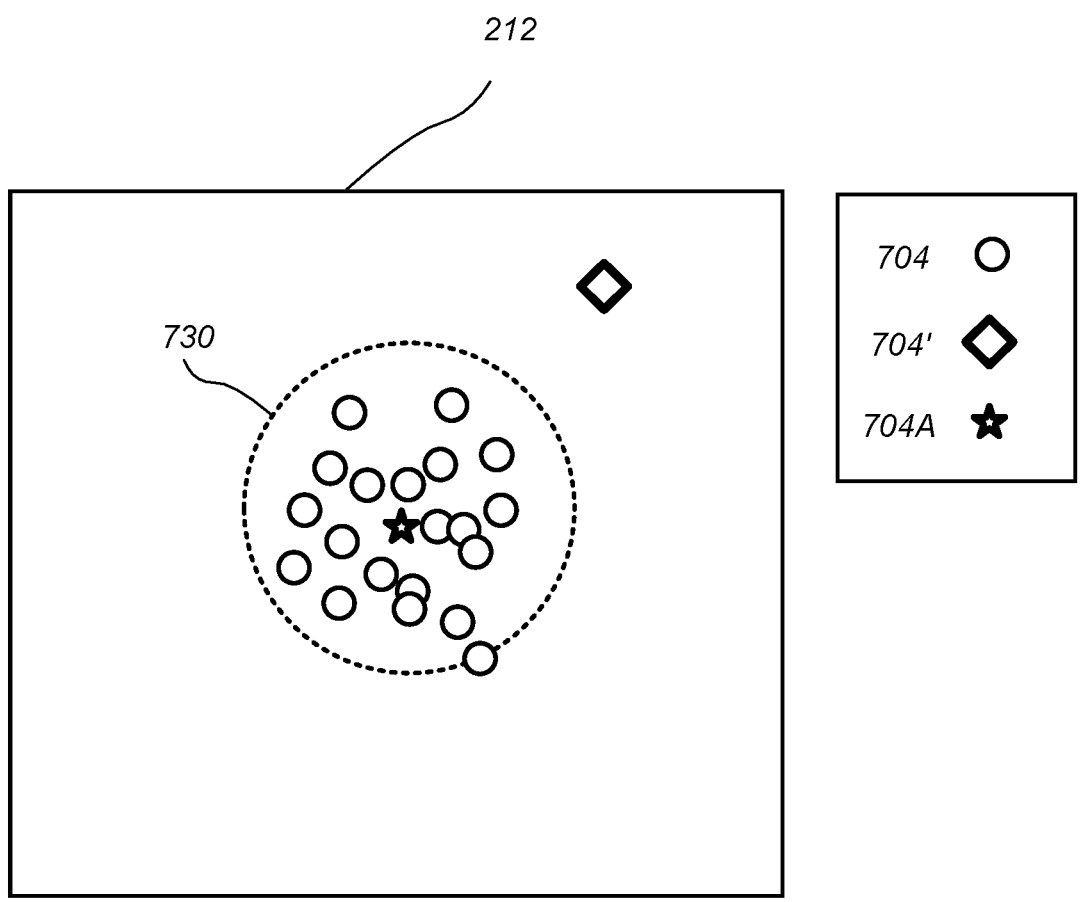
FIG. 9 depicts a representation of an embodiment of a feature space with temporary templates.

In certain embodiments, selecting the virtual template in 708 includes assessing temporary templates 704 to determine a median temporary template in the stored temporary templates. The median temporary template may be, for example, a median selected from a cluster of temporary templates 704 in a feature space. FIG. 9 depicts a representation of an embodiment of feature space 212 with temporary templates 704. As shown in FIG. 9, temporary templates 704 may form into a cluster of data. The cluster of temporary templates 704 may be represented by circle 730. In some embodiments, outlying temporary templates are not used in determining the cluster of templates (and thus the median template). For example, temporary template 704' may be an outlier temporary template that is not used for determining the cluster of templates. Assessment (e.g., analysis) of the cluster of temporary templates 704 may determine a median temporary template (e.g., temporary template 704A shown by the star in FIG. 9). The median temporary template 704A may then be selected as the "virtual" temporary template (e.g., "virtual" template 710 in process 700, as shown in FIG. 8).

In some embodiments, feature space 212 with temporary templates 704 may include multimodal clusters of template data. For example, two or more clusters of data may be present in the feature space with temporary template data. In some embodiments with multimodal clusters of temporary template data, a cluster may be chosen (e.g., a denser cluster or the cluster with more data points) and a median selected from the chosen cluster. In some embodiments with multimodal clusters of temporary template data, it may not be possible to choose a cluster. In such embodiments, the user being captured in the images may be chosen to not be suitable for process 700. The user being captured in the images may also be chosen to not be suitable for process 700 if no clusters can be determined from the temporary templates data.

Figure 10:
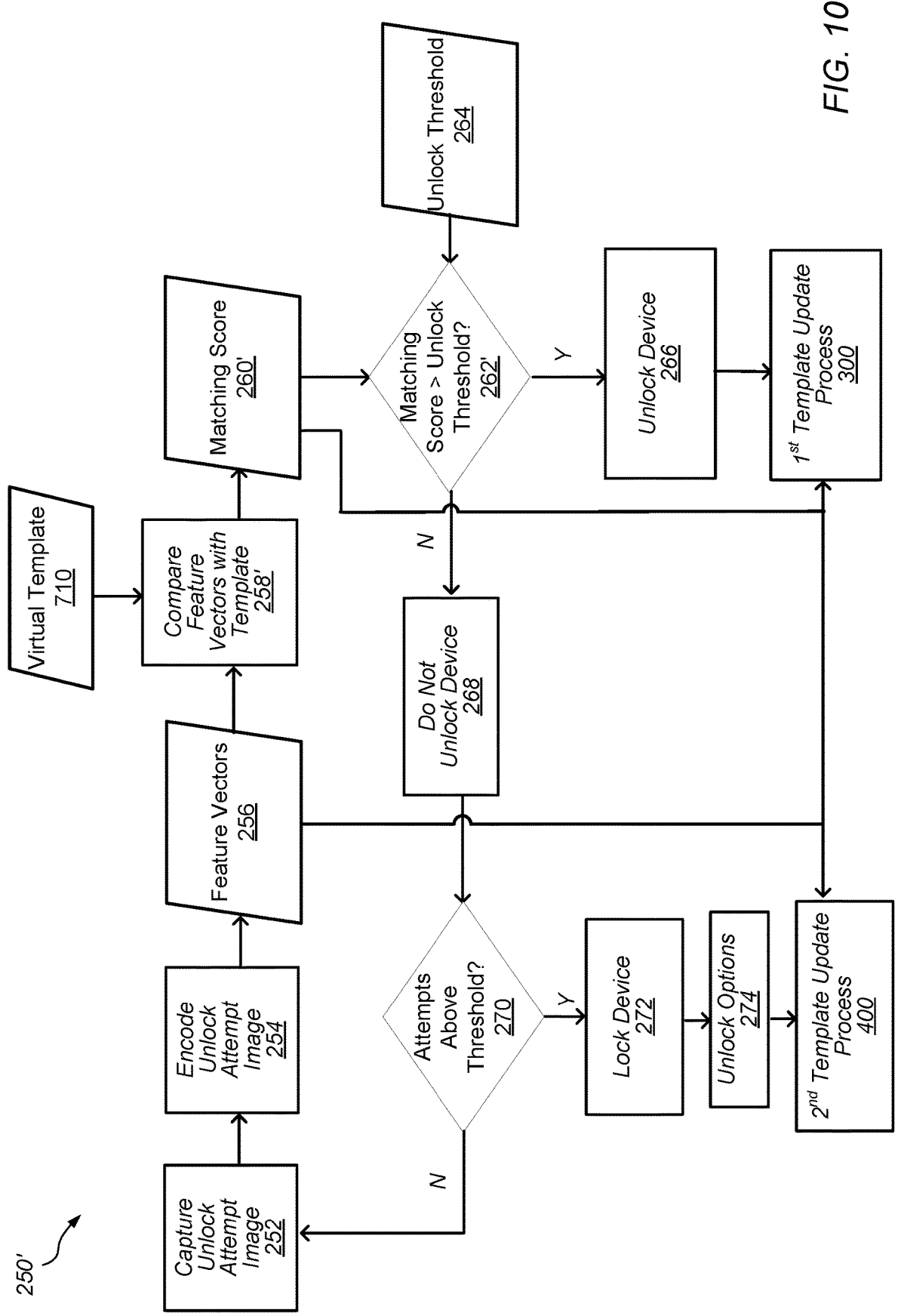
FIG. 10 depicts a flowchart of another embodiment of a facial recognition authentication process.

As shown in FIG. 8, after virtual template 710 is selected, the virtual template may be used in facial recognition authentication process 250'. FIG. 10 depicts a flowchart of an embodiment of facial recognition authentication process 250'. Process 250' may operate similar to process 250 (shown in FIG. 7) using virtual template 710 instead of template space 220. The thresholds in process 250' (e.g., unlock threshold 264 and the threshold in 270) may be the same as the thresholds in process 250. In some embodiments, virtual template 710 may also be updated using either first template update process 300 and/or second template update process 400 (described herein with respect to template space 220). Thus, virtual template 710 may be updated for changes to the user similar to template space 220.

Process 250' may operate substantially in parallel with process 250 for additional unlock attempts of device 100 after virtual template 710 has been selected. Process 250' and process 250 may operate on the same unlock attempt images 252 captured by device 100. Process 250' may operate to compare feature vectors 256 from the captured images to virtual template 710 in 258' and determine matching score 260'. Matching score 260' may then be used to determine whether device 100 is able to be unlocked using the virtual template. In certain embodiments, process 250' does not determine actual unlocking of device 100 (unlocking of the device is only determined by process 250). For example, process 250' is a "virtual" process that assesses the effectiveness of virtual template 710 for facial recognition authentication of the user while process 250 determines unlocking of device 100 using template space 220. As such, process 250' may be operated to assess the performance of virtual template 710 in comparison to template space 220. In some embodiments, process 250' may be used to determine unlocking of device 100 in addition to unlocking determine by process 250 (e.g., either process 250 or process 250' may unlock the device).

As shown in FIG. 8, the performance of virtual template 710 in process 250' is assessed in 712. Assessing the performance of virtual template 710 in 712 may include assessing any properties that determine the effectiveness or ineffectiveness of using virtual template in attempting to match a user in captured images to the authorized user of device 100. For example, assessing the performance in 712 may include assessing acceptance rates and/or rejection rates in process 250' using virtual template 710. The performance of virtual template 710 may be assessed in 712 over a selected time frame (e.g., a period of time) on device 100. In some embodiments, the performance of virtual template 710 may be assessed for a selected number of unlock attempts.

At the same time as the performance of virtual template 710 is being assessed in 712 for the additional unlock attempts, performance of template space 220 (being operated on in process 250) may be assessed in 714. Assessing the performance of template space 220 in 714 may include assessing the same properties assessed in 712 for virtual template 710. In 716, the performance of virtual template 710 assessed in 712 may be compared to the performance of template space 220 assessed in 714. Comparing the performances may include comparing the performances over the selected time frame or the selected number of unlock attempts.

In certain embodiments, in 718, a decision may be made if virtual template 710 is added to template space 220 or if the virtual template is to be deleted. For example, if the performance of virtual template 710 is determined, by comparison 716, to be less than the performance of static templates 216 in template space 220, then virtual template 710 may be deleted in 720. In some embodiments, after virtual template 710 is deleted in 720, process 700 may operate again beginning with an additional successful unlock attempt to generate a new virtual template for performance assessment.

In certain embodiments, if the performance of virtual template 710 is determined, by comparison 716, to be higher than at least one of static templates 216 in template space 220, then the virtual template may be added to the template space in 722. During the enrollment process (e.g., process 200), the user is asked to move and behave in certain ways to provide controlled image captures for generating static templates 216. Controlling the user's behavior during the image captures for enrollment generates static templates 216 that may provide satisfactory performance of the facial recognition authentication process for the user (e.g., the user encounters acceptable pass/fail rates for unlocking the device). Users may, however, typically operate device 100 with different behavior than the controlled behavior during the enrollment process. As virtual template 710 is generated based on the behavior of the user during unlock attempts of device 100 over a period of time, the virtual template may provide better and more satisfying unlock performance over time as compared to one or more static templates 216.

In some embodiments, adding virtual template 710 to template space 220 in 722 includes adding the virtual template and increasing the number of static templates in the template space (e.g., if there are nine static templates, adding the virtual template creates ten static templates in the template space). In some embodiments, adding virtual template 710 to template space 220 in 722 includes replacing one of static templates 216 in template space 220 with virtual template 710. For example, virtual template 710 may replace one of static templates 216 that the virtual template outperforms. In some embodiments, virtual template 710 replaces the lowest performing static template 216 in template space 220.

In some embodiments, adding virtual template 710 to template space 220 in 722 includes replacing more than one static template 216 in the template space. For example, virtual template 710 may replace all templates that the virtual template outperforms. In some embodiments, virtual template 710 may replace all static templates 216 in template space 220. In such embodiments, virtual template 710 becomes the only static template in template space 220. Virtual template 710 may become the only static template in template space 220 if, for example, the virtual template has a sufficient performance to provide suitable acceptance rates and rejection rates while providing minimal false acceptance and false rejection rates. Virtual template 710 may potentially provide better performance than static templates 216, which are obtained from enrollment images, because the virtual template is generated from actual use of device 100 by the user (e.g., based on "how" the user uses the device rather than the ideal scenarios used during enrollment).

In some implementations, a user may need more than one virtual template to provide suitable performance in replacing all static templates 216 obtained from enrollment. In some implementations, as described above, the performance of virtual template 710 may be determined to be less than the performance of static templates 216 in template space 220 and the virtual template is deleted. The performance of virtual template 710 may be less, for example, if the user has large variances in his/her behavior when attempting to unlock device 100. In some embodiments, additional mitigations may be applied to template space 220 after virtual template 710 is added to and/or replaces static templates 216 in the template space. Mitigations may be applied, for example, to prevent virtual template 710 from adversely affecting false acceptance and/or false rejection rates.

In certain embodiments, a new or updated module (e.g., a new or updated neural network module) is installed on device 100. The new or updated neural network module may be installed, for example, during a software update on device 100. The new neural network module may be a new or updated neural network module that is installed in ISP 110 and/or SEP 112 (shown in FIG. 3). It is to be understood that while updates are described herein in the context of neural network module(s) used for facial authentication, embodiments for assessing performance of an update and implementation of an update described herein may also be applied to authentication algorithms (e.g., facial authentication algorithms) other than those that utilize neural network modules. For example, embodiments described herein for assessing performance of an update and implementation of an update may be applied to any facial authentication algorithm that utilizes processed data (e.g., template data) for authentication of a user.

Figure 11:
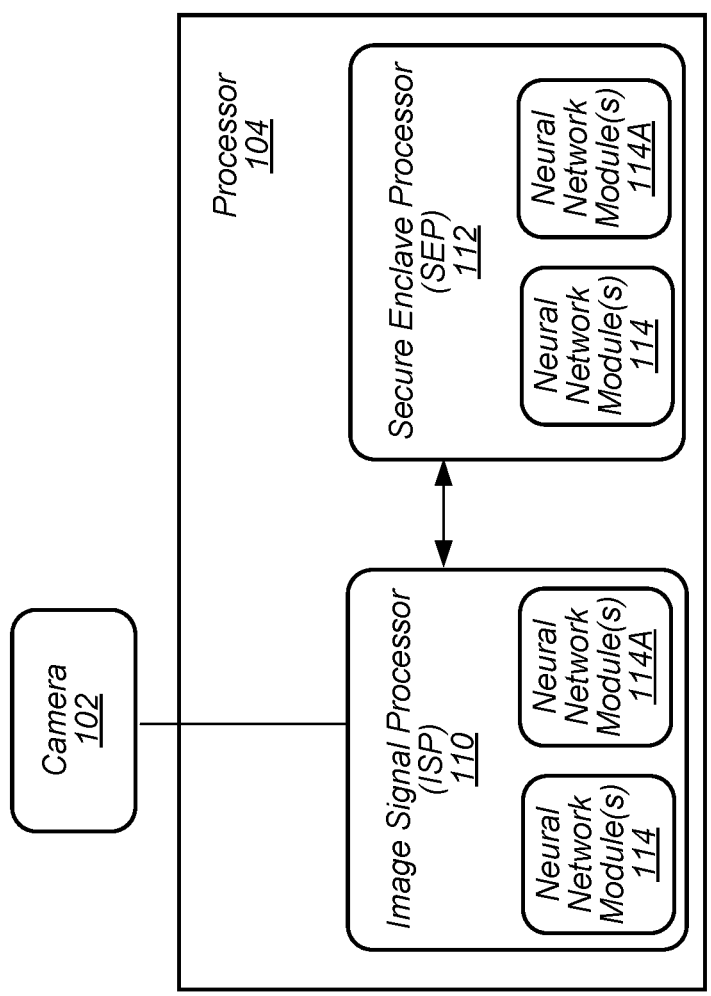
FIG. 11 depicts a representation of an embodiment of a processor on a device with two versions of neural network modules installed.

In certain embodiments, the new neural network module is installed without removing previously installed versions of the neural network module. For example, FIG. 11 depicts a representation of an embodiment of processor 104 on device 100 with one or more neural network modules 114 and one or more neural network modules 114A installed in ISP 110 and SEP 112. Neural network module(s) 114 may be currently operating versions of the neural network module(s) while neural network module(s) 114A may be new or updated versions of the neural network module(s) that are intended to replace the currently operating versions. It is to be understood that an update (e.g., a software update) may include an update to one neural network module (e.g., one neural network module in either ISP 110 or SEP 112) or an update to multiple neural network modules (e.g., multiple neural network modules in ISP 110 or SEP 112 or neural network modules in both ISP 110 and SEP 112).

In certain embodiments, neural network module(s) 114A (e.g., the new or updated neural network module(s)) operate in parallel (or substantially in parallel) with neural network module(s) 114 (e.g., the existing neural network module(s)) for a period of time before fully switching operation of processor 104 to the new or updated neural network modules (e.g., neural network modules 114A). For example, neural network module(s) 114A may run "virtually" alongside neural network module(s) 114 for a period of time until a determination can be made that the performance of neural network module(s) 114A meets sufficient performance criteria for operation of processor 104. It is to be understood that in this context, a "period of time" may include an actual or prescribed amount of time (e.g., a prescribed period of minutes, hours, days, etc.) as well as a period that is not necessarily a prescribed amount of time. For example a "period of time" could be a specific number of unlock attempts or could be a time that neural network module(s) 114A run "virtually" alongside neural network module(s) 114 until a specific amount of accuracy in authentication is achieved by neural network module(s) 114A and such accuracy is maintained for a minimum amount of time. The following description provides embodiments describing the implementation of a new or updated neural network module in association with facial recognition authentication process 250 and/or facial recognition authentication process 250', which may be located in SEP 112. It is to be understood, however, that a similar implementation of a new or updated neural network module in association with a face detection process, which may be located in ISP 110, may also be possible.

Figure 12:
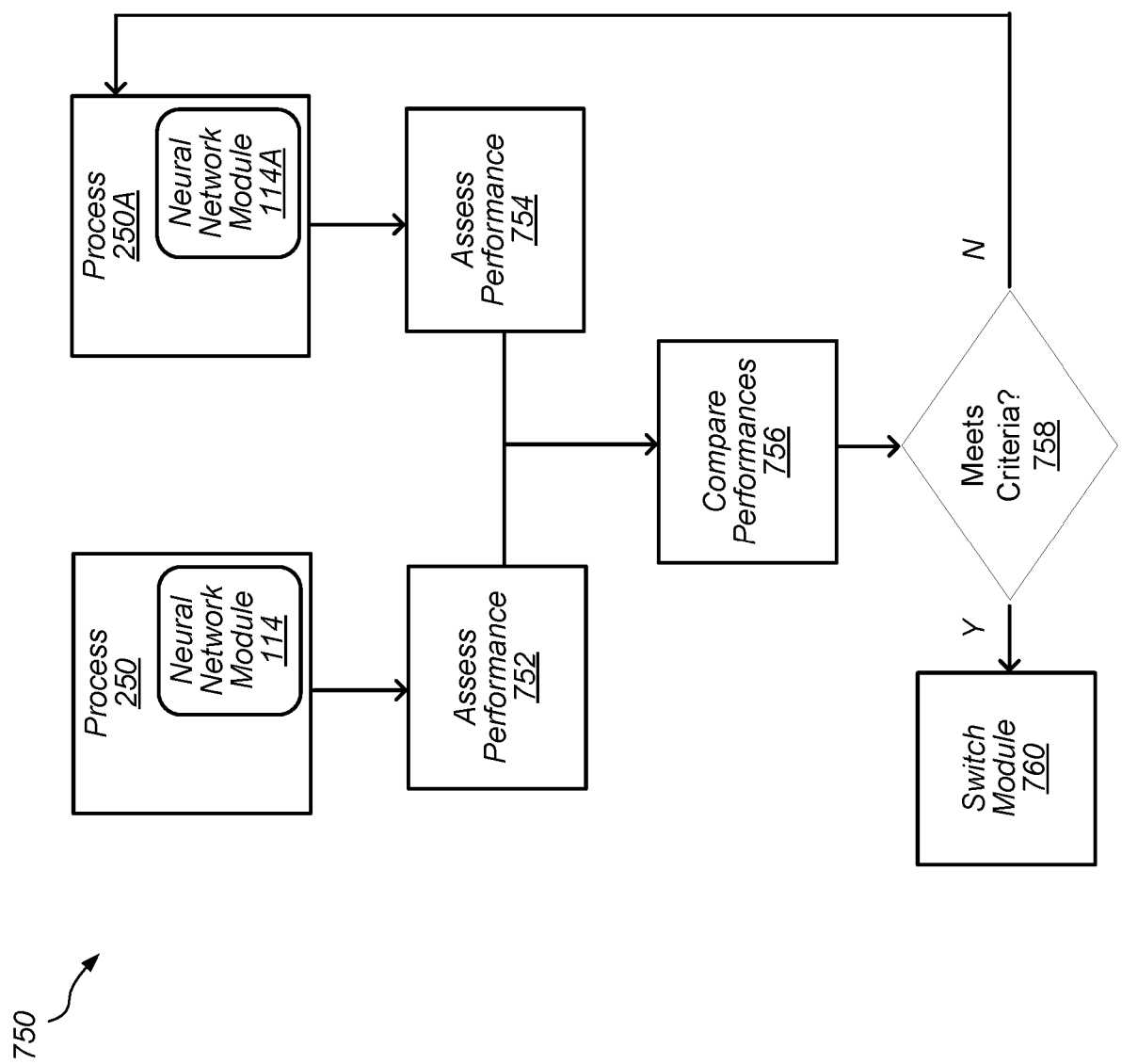
FIG. 12 depicts a flowchart of an embodiment of a process used to assess the performance of a facial recognition authentication processing on a device.
Figure 14:
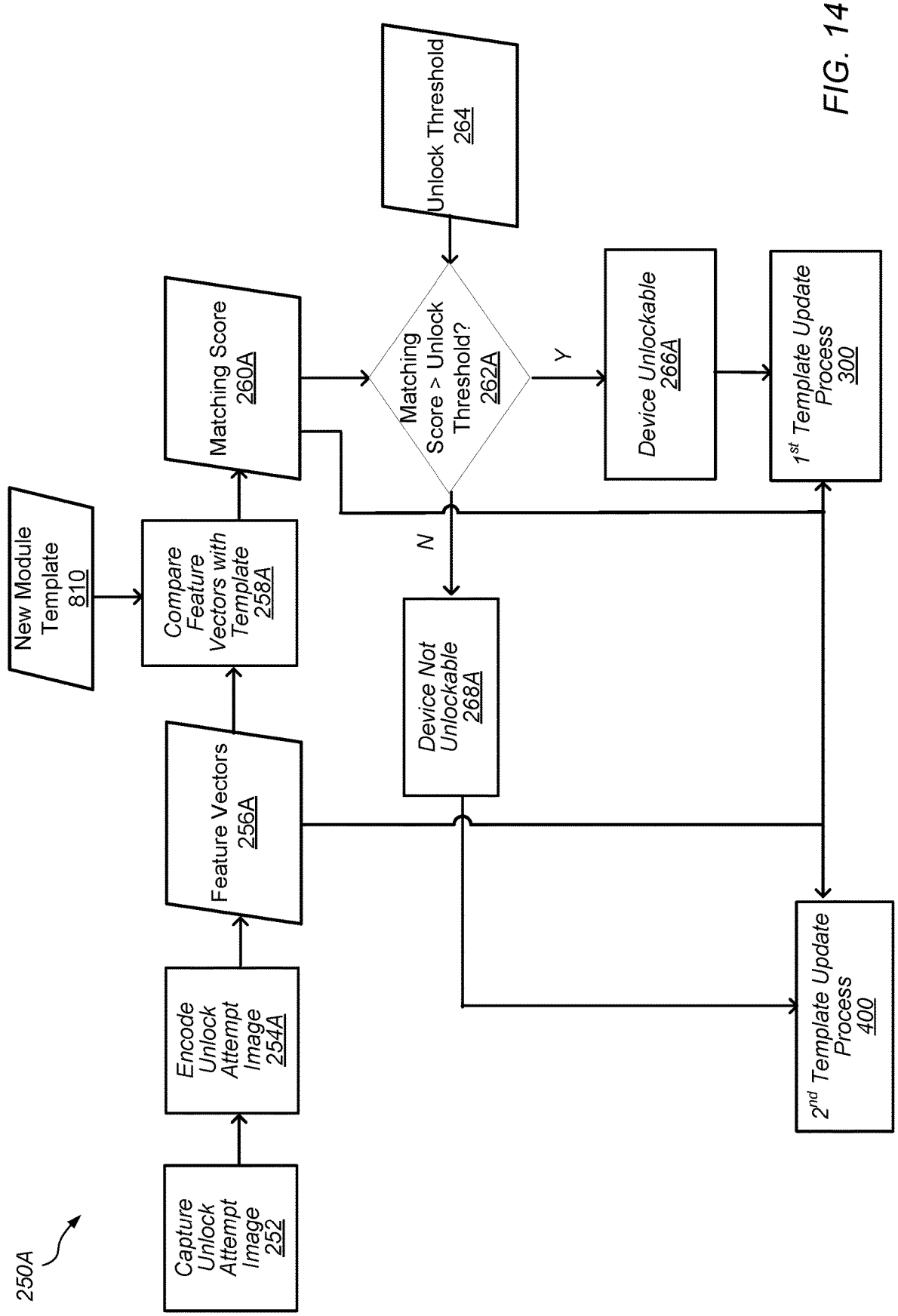
FIG. 14 depicts a flowchart of yet another embodiment of a facial recognition authentication process.

FIG. 12 depicts a flowchart of an embodiment of process 750. Process 750 may be used to assess the performance of facial recognition authentication processing on device 100 using a new or updated neural network module (e.g., neural network module 114A) versus using a currently operating neural network module (e.g., neural network module 114). In certain embodiments, neural network module 114 (e.g., the currently operating module) operates facial recognition authentication process 250 (shown in FIG. 7) and/or facial recognition authentication process 250' (shown in FIG. 10)

while neural network module 114A (e.g., the new or updated module) operates facial recognition authentication process 250A (shown in FIG. 14). For the following description, process 750 is described with respect to facial recognition authentication process 250 being operated on neural network module 114. It is to be understood, however, that, as described herein, process 750 may proceed using facial recognition authentication process 250' operating on neural network module 114 in lieu of, or in addition to, facial recognition authentication process 250.

In certain embodiments, facial recognition authentication processing 250 is used for actual unlock decisions (e.g., "unlock device 266" or "lock device 272", shown in FIG. 7) for device 100 while facial recognition authentication processing 250A does not affect any unlock decisions for the device while process 750 is assessing performances of the neural network modules. Thus, facial recognition authentication process 250A may run "virtually" along with facial recognition authentication process 250. Facial recognition authentication process 250 and facial recognition authentication process 250A may operate using the same image input (e.g., "capture unlock attempt image 252", shown in FIGS. 7 and 14). Using the same image input in both facial recognition authentication process 250 and facial recognition authentication process 250A may produce a more accurate comparison between the processes in process 750.

In certain embodiments, facial recognition authentication process 250A (operated using neural network module 114A) runs temporally proximate to facial recognition authentication process 250 (operated using neural network module 114). For example, facial recognition authentication process 250 may operate to provide the actual unlock decision and facial recognition authentication process 250A may run subsequently once the unlock decision is made by facial recognition authentication process 250 to determine the "virtual" unlock decision for process 250A. In such embodiments, a captured image (e.g., "capture unlock attempt image 252", shown in FIGS. 7 and 14) may be temporarily stored after being input into facial recognition authentication process 250 until the image is used in facial recognition authentication process 250A. For example, the captured image may be stored in kernel RAM or another temporary park for data. The captured image data may only be temporarily stored to prevent permanent storage of images (e.g., raw user data) on device 100 (e.g., images may only be stored until an additional unlock attempt is made). In some embodiments, facial recognition authentication process 250A runs substantially in parallel with facial recognition authentication process 250 (e.g., the processes are run substantially simultaneously on their respective neural network modules).

As shown in FIG. 12, the performance of facial recognition authentication process 250 may be assessed in 752 while the performance of facial recognition authentication process 250A may be assessed in 754. Assessing the performances in 752 and 754 may include, for example, assessing data for the acceptance and/or rejection of unlock attempt images using facial recognition authentication processes 250, 250A. In 756, the performances assessed in 752 and 754 may be compared. Comparison in 756 of the performances assessed in 752 and 754 may include a comparison of results of individual unlock attempts using each process (facial recognition authentication process 250 and facial recognition authentication process 250A) and/or an overall comparison over time using data for multiple unlock attempts using each process. Comparing the performance of facial recognition authentication process 250 to the performance of facial recognition authentication process 250A in 756 may be used to determine if the performance of facial recognition authentication process 250A meets one or more selected performance criteria in 758. The selected performance criteria may include, for example, comparison of acceptance rates, rejection rates, false acceptance rates, and/or false rejection rates between facial recognition authentication process 250 and facial recognition authentication process 250A.

If the performance of facial recognition authentication process 250A meets the selected performance criteria in 758, then device 100 may switch facial recognition authentication process 250 from operating on neural network module 114 (e.g., the old neural network module) to operating on neural network module 114A (e.g., the new or updated neural network module) in 760. In some embodiments, neural network module 114 may then be removed (e.g., deleted) from device 100. If the performance of facial recognition authentication process 250A does not meet the selected performance criteria in 758, then process 750 may be repeated until facial recognition authentication process 250A meets the selected performance criteria. In some embodiments, when facial recognition authentication process 250A fails to meet the selected performance criteria in 758, the template used in facial recognition authentication process 250A (e.g., new module template 810, shown in FIG. 13 and described below) may be updated or replaced before the facial recognition authentication process is repeated.

Figure 13:
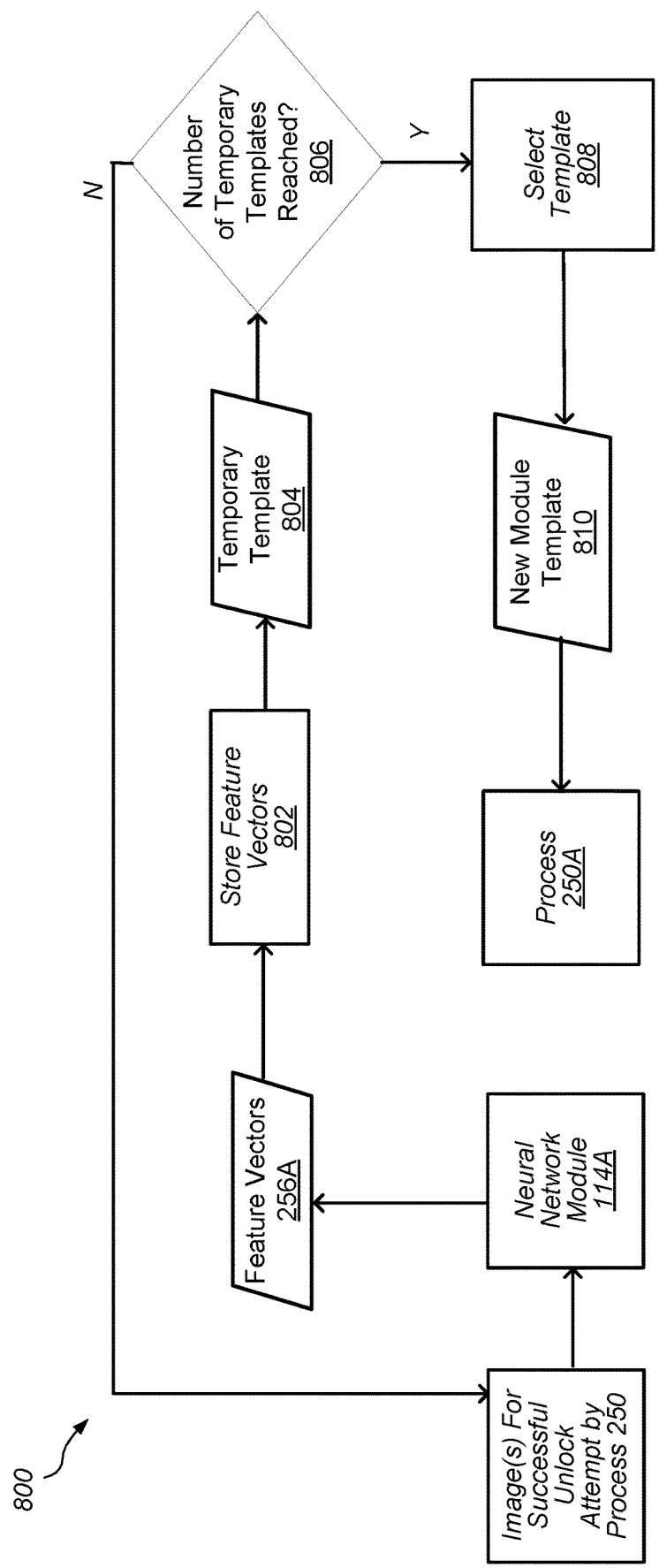
FIG. 13 depicts a flowchart of an embodiment of a process used to generate a new "virtual" static template.

FIG. 13 depicts a flowchart of an embodiment of process 800. Process 800 may be used to generate a new "virtual" static template for use by neural network module 114A and facial recognition authentication process 250A. The new virtual static template may be used in facial recognition authentication process 250A and used to assess the performance of neural network module 114A. Based on the performance assessment, the new virtual static template may potentially be used as a static template by neural network module 114A once operation of facial recognition authentication process 250 is switched to the new or updated neural network module (e.g., neural network module 114A).

Process 800 may begin after a successful unlock attempt using facial recognition authentication process 250 (being operated by neural network module 114). For example, process 800 may begin after, as shown in FIG. 7, feature vectors 256 have matching score 260 above unlock threshold 264 and the device is unlocked in 266. In certain embodiments, the image(s) used for the successful unlock attempt by facial recognition authentication process 250 is input to and processed by neural network module 114A (associated with facial recognition authentication process 250A) to generate feature vector(s) 256A. In some embodiments, neural network module 114A generates feature vector(s) 256A from the image(s) by encoding the image(s) using operations that are used in facial recognition authentication process 250A (e.g., neural network module 114A encodes the image(s) to generate feature vectors using the same type of encoding used to generate feature vectors in facial recognition authentication process 250A).

Feature vector(s) 256A may then be stored in a space (e.g., a backup space) in the memory of device 100 in 802. The space used for storing feature vector(s) 256A may be a space associated with neural network module 114A. Feature vector(s) 256A may be stored as temporary template 804. Thus, temporary template 804 may be a template associated with unlocking of device 100.

In 806, the number of temporary templates 804 stored in the memory device are counted and compared to a selected number of temporary templates (e.g., a threshold number of templates). The selected number of temporary templates may include a number of temporary templates suitable for a reasonable set of data (e.g., a number of templates that provides reasonable statistical results). In some embodiments, the selected number of temporary templates is a typical number of templates stored over a selected period of time (e.g., a number of templates typically stored over a number of days or a number of weeks).

If the number of temporary templates 804 is below the selected number in 806, then additional feature vector(s) 256A may be generated by neural network module 114A after additional successful unlock attempts by process 250. Additional feature vectors 256A may be added to generate additional temporary templates until the selected number of temporary templates 804 is reached in 806. Once the selected number of temporary templates 804 is reached in 806, process 800 may continue with selecting a temporary template in 808. Selecting the temporary template in 808 may include selecting the "new module" template 810 for process 800 that may be used in facial recognition authentication process 250A, shown in FIG. 14.

In certain embodiments, selecting the temporary template in 808 includes assessing temporary templates 804 to determine a median temporary template in the stored temporary templates. The median temporary template may be, for example, a median selected from a cluster of temporary templates 804 in a feature space (e.g., the median template is selected according to the embodiment described for FIG. 9 above). The median temporary template selected may then be used as "new module" template 810, as shown in FIG. 13. New module template 810 may be provided to facial recognition authentication process 250A, described below. In some embodiments, new module template 810 may operate as a "virtual" template, described herein, in facial recognition authentication process 250A.

FIG. 14 depicts a flowchart of an embodiment of facial recognition authentication process 250A. As described above, facial recognition authentication process 250A may operate on the new or updated neural network module (e.g., neural network module 114A) to determine when the new or updated neural network module is to be used for unlock operation of device 100. Facial recognition authentication process 250A may operate similar to process 250 (shown in FIG. 7) using new module template 810 instead of template space 220. The thresholds in process 250A (e.g., unlock threshold 264 and the threshold in 270) may be the same as the thresholds in process 250 (e.g., the thresholds may be copied from neural network module 114 to neural network module 114A).

As described above, facial recognition authentication process 250A, shown in FIG. 14, may operate "virtually" alongside facial recognition authentication process 250. Also as described above, process 250A may operate on the same unlock attempt images 252 captured for process 250. Process 250A may begin with encoding of the unlock attempt image in 254A. Encoding of the unlock attempt image may generate feature vector(s) 256A. Encoding of the unlock attempt image and generation of feature vector(s) 256A may be implemented using neural network module 114A. Thus, feature vector(s) 256A are feature vector(s) associated with the new or updated neural network module.

In 258A, feature vector(s) 256A may be compared to new module template 810 to determine matching score 260A. Matching score 260A may then be used to determine whether device 100 is able to be unlocked using new module template 810. As described above, in certain embodiments, process 250A does not determine actual unlocking of device 100 (unlocking of the device is only determined by process 250). In 262A, if matching score 260A is above unlock threshold 264, the user in the unlock attempt image is authenticated as the authorized user in new module template 810 and device 100 is determined to be "unlockable" in 266A. In certain embodiments, after device 100 is determined unlockable in 266A, new module template 810 may be updated with dynamic templates using first template update process 300, described herein with respect to template space 220 and shown in FIG. 15. Put in paragraph that 266A and 268A are used for comparisons of authentication In 262A, if matching score 260A is below unlock threshold 264 (e.g., not equal to or above the unlock threshold), then device 100 is determined to be "not unlockable" in 268A. In some embodiments, after device 100 is determined to be "not unlockable" in 268A, feature vector(s) 256A and matching score 260A may be provided to second template update process 400, described herein with respect to template space 220 and shown in FIG. 18, to update new module template 810 with dynamic templates.

In certain embodiments, the determinations of "unlockable" in 266A and "not unlockable" in 268A are used for comparisons of facial recognition authentication process 250A to facial recognition authentication process 250. For example, the determinations of "unlockable" in 266A and "not unlockable" in 268A for process 250A may be compared to the determinations, shown in FIG. 7, of "unlock device" in 266 and "do not unlock device" in 268 for process 250. Thus, the determinations of "unlockable" in 266A and "not unlockable" in 268A for process 250A may be used to determine whether to update templates (e.g., using first template update process 300 or second template update process 400) and may also be used for determining accuracy of "virtual" unlock decisions made by process 250A by comparing the virtual unlock decisions to unlock decisions made by process 250 without actually unlocking or locking the device with decisions made by process 250A.

As described above, new module template 810 may be updated with new dynamic templates using either first template update process 300 and/or second template update process 400 (described herein with respect to template space 220). Thus, new module template 810 may be updated with dynamic templates similar to template space 220. Adding dynamic templates to new module template 810 may provide the new module template with one static template (e.g., the static template generated by process 800) and a number of dynamic templates. In some embodiments, dynamic templates are added to new module template 810 while the performance of neural network module 114A is being assessed during process 750, depicted in FIG. 12. In some embodiments, dynamic templates are added to new module template 810 after neural network module 114A is implemented for facial recognition authentication process 250 (e.g., the neural network module is used for actual unlock decisions on device 100). As described herein for template space 220, dynamic templates may be continually added/removed from new module template 810 as facial recognition authentication process 250 continues to be operated on device 100.

As described above with respect to process 750 in FIG. 12, when the performance of facial recognition authentication process 250A meets the selected performance criteria in 758, then device 100 may switch facial recognition authentication process 250 from operating on neural network module 114 to operating on neural network module 114A. In certain embodiments, when facial recognition authentication process 250 is switched to operating on neural network module 114A, facial recognition authentication process 250 may operate using new module template 810 (e.g., the new module template replaces template space 220).

In certain embodiments, as described above, new module template 810 includes a static template that has been generated based on successful unlocking of device 100 using the older neural network module (neural network module 114). In such embodiments, new module template 810 is generated automatically during operation of device 100 without the need for the authorized user to generate a new enrollment profile or re-enroll himself/herself for the new or updated neural network module (neural network module 114A). Thus, generation of new module template 810 may provide the user with a seemingly seamless transition experience from the older neural network module to the new or updated neural network module after a software update on device 100. In some embodiments, one or more dynamic templates are also added to new module template 810 (using process 300 and/or process 400). The addition of dynamic template(s) to the static template in new module template 810 may provide an enhanced usability experience of device 100 for the user.

In some embodiments, as described above with respect to process 750 in FIG. 12, when the performance of facial recognition authentication process 250A does not meet the selected performance criteria in 758, then process 750 may be repeated. In some embodiments, before process 750 is repeated, new module template 810 may be deleted and replaced with another new module template (e.g., a newer version of the new module template). In such embodiments, process 800, shown in FIG. 13, may be used to generate the newer version of new module template 810. In some embodiments, before process 750 is repeated, new module template 810 may be updated with new templates. For example, dynamic templates may be added to new module template 810 before process 750 is repeated.

In some embodiments, process 750, shown in FIG. 12, includes assessing, in 752, the performances of both facial recognition authentication process 250 (using template space 220) and facial recognition authentication process 250' (using virtual template 710). In 754, the performance of facial recognition authentication process 250A (using new module template 810) is assessed. The performances of both facial recognition authentication process 250 and facial recognition authentication process 250' may then be compared to the performance of facial recognition authentication process 250A in 756.

Comparing the assessed performances for both template space 220 (which includes multiple static templates generated from enrollment) and virtual template 710 (which includes a single static template generated during operation of device 100) to the assessed performance for new module template 810 (which also includes a single static template generated during operation of the device) may provide insight into whether a single static template is suitable for the authorized user of the device. For example, if the performance of both virtual template 710 and new module template 810 are poor compared the performance of template space 220, the authorized user may not be a suitable candidate for facial recognition authentication using a single static template. In such cases, the authorized user may be prompted to generate a new enrollment profile for the new or updated neural network module instead of being able to use new module template 810 (e.g., a new template space 220 is generated for the authorized user on the new or updated neural network module). If, however, virtual template 710 provides a satisfactory performance compared to the performance of template space 220 with new module template 810 not providing a satisfactory performance (e.g., does not meet the selected performance criteria), it may be possible that new module template 810 was not properly generated. In such instances, a replacement new module template may be generated (e.g., using process 800) and an additional performance assessment may be implemented (e.g., process 750 may be repeated using the replacement new module template).

Figure 15:
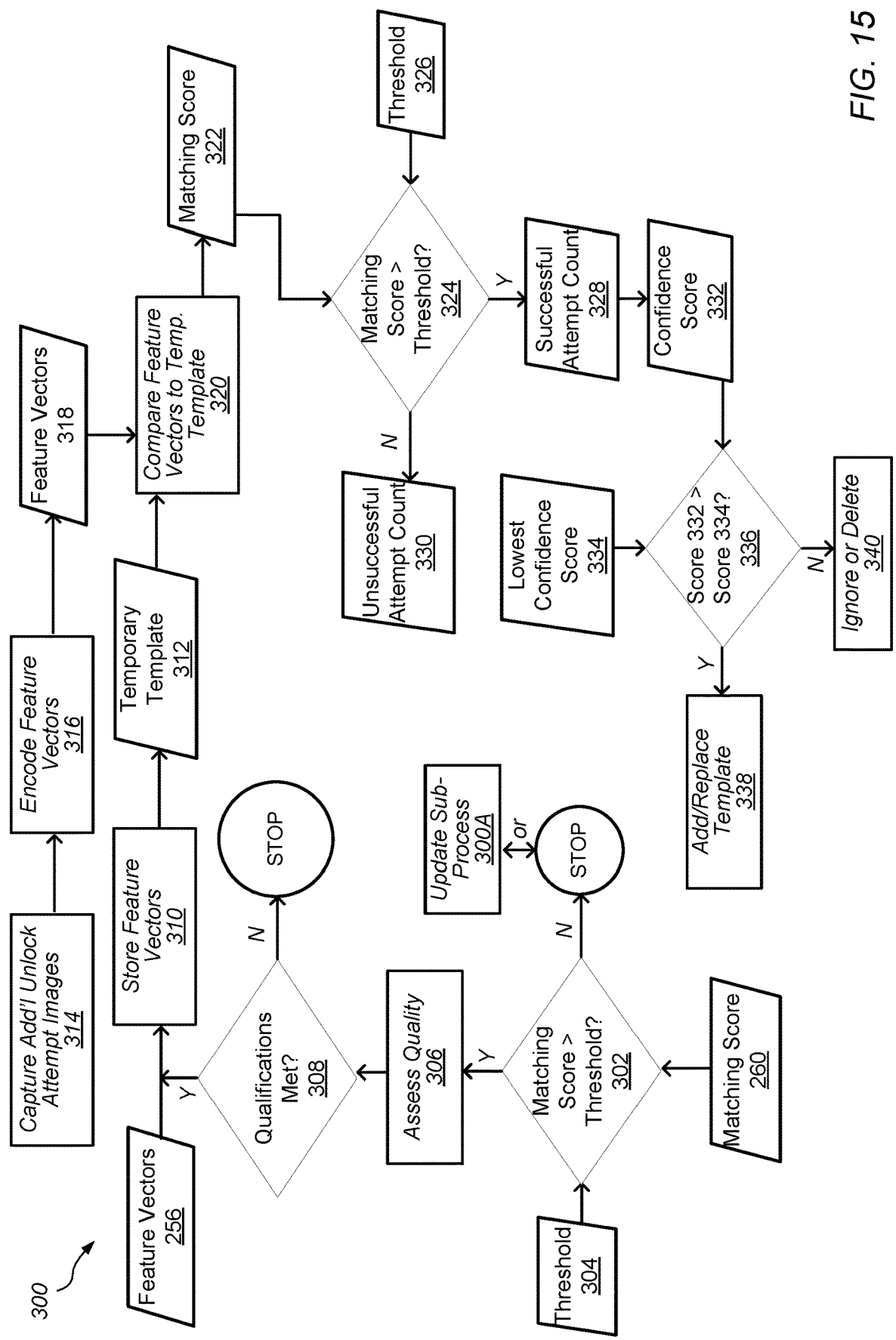
FIG. 15 depicts a flowchart of an embodiment of a template update process.

FIG. 15 depicts a flowchart of an embodiment of first template update process 300. Process 300 may be used to update template space 220 (shown in FIG. 6) with one or more additional dynamic templates 226 based on feature vector(s) 256 from process 250. In certain embodiments, process 300 is used to update template space 220 for an enrollment profile (e.g., the enrollment profile used in process 250) on device 100. Process 300 may be used to update template space 220 for gradual changes in the appearance of the authorized user associated with the enrollment profile. For example, process 300 may update template space 220 for gradual changes in hair (e.g., hair color, hair length, and/or hair style), weight gain, weight loss, changes in glasses worn, or small disfigurement changes (e.g., black eyes, scars, etc.). Updating template space 220 using process 300 allows the authorized user to continue to successfully access device 100 using facial recognition authentication process 250 despite the gradual changes in the appearance of the user.

Process 300 may begin by assessing 302 if matching score 260 is above threshold 304. Threshold 304 may be a threshold score for determining if feature vector(s) 256 are similar (e.g., close) enough to feature vectors 210 (from static templates 216) that feature vector(s) 256 may potentially be used as another template (e.g., the threshold score may determine if feature vectors 256 are within a certain distance of feature vectors 210). In certain embodiments, threshold 304 is greater than (above) unlock threshold 264 (e.g., threshold 304 requires a higher matching score than unlock threshold 264). Thus, the threshold for feature vector(s) 256 becoming a template may be stricter than the threshold for unlocking the device. Threshold 304 may be set during manufacturing and/or by the firmware of device 100. Threshold 304 may be updated (e.g., adjusted) by device 100 during operation of the device as described herein.

In some embodiments, if matching score 260 is below threshold 304, then process 300 is stopped and feature vector(s) 256 are deleted from device 100. In some embodiments, if matching score 260 is below threshold 304, then process 300 continues with template update sub-process 300A, described in FIG. 17. If matching score 260 is above threshold 304, then process 300 is continued. In some embodiments, after assessing 302, one or more qualities in the unlock attempt image are assessed in 306. For example, pose (e.g., pitch, yaw, and roll of the face), occlusion, attention, field of view, and/or distance in the unlock attempt image may be assessed in 306. Pose and/or occlusion in the unlock attempt image may be assessed using the landmark and/or occlusion maps described herein. In 308, if suitable qualifications are not met, then process 300 may be stopped. In certain embodiments, meeting suitable qualifications includes meeting selected criteria in the images for one or more of the assessed qualities described above. For example, selected criteria may include, but not be limited to, the face of the user being in the field of view of the camera, a pose of the user's face being proper (e.g., the user's face is not turned too far in any direction from the camera (i.e., the pitch, yaw, and/or roll of the face are not above certain levels) a distance to the face of the user being within a certain distance, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, assessing qualities in 306 and 308 may occur in a different location within process 300. For example, assessing qualities in 306 and 308 may occur after comparing matching score 324 to threshold 326 or after comparing confidence score 332 to confidence score 334 in 336, described below.

If suitable qualifications are met in 308, then process 300 continues, in 310, with storing feature vector(s) 256 in a backup space in the memory of device 100. The backup space in the memory may be, for example, a second space or temporary space in the memory that includes readable/writable memory and/or short term memory. Feature vector(s) 256 may be stored in the memory as temporary template 312.

In certain embodiments, after temporary template 312 is stored in the backup space in the memory, process 300 continues by comparing the temporary template to feature vectors for additional unlock attempt images captured by device 100 for the authorized user. In 314, additional unlock attempt images are captured of the user (or users if unauthorized access is attempted) as the user(s) during additional (future) unlocking attempts of device 100. The features of the face of the user in the additional unlock attempt images are encoded in 316 to generate feature vectors 318. In 320, feature vectors 318 are compared to temporary template 312 to get matching score 322.

Matching score 322 may then be compared in 324 to threshold 326. In some embodiments, threshold 326 is unlock threshold 264. In some embodiments, threshold 326 is threshold 304. If matching score 322 is above threshold 326 in 324, then a successful attempt is counted in 328. If matching score 322 is below threshold 326 in 324, then an unsuccessful attempt is counted in 330. Counts 328 and 330 may be continued until a desired number of unlock attempts are made (e.g., a desired number of comparisons of matching score 322 and threshold 326). Once the desired number of attempts is made, the number of successful attempts in 328 out of the total number of unlock attempts (e.g., the sum of counts 328 and 330) may be used to assess confidence score 332 for temporary template 312. For example, there may be 45 successful attempts out of 50 total unlock attempts so confidence score 332 is 45/50 or 90%. Confidence score 332 may be used to assess whether or not template 312 is added as dynamic template 226 to template space 220, shown in FIG. 6.

As described above, initially after enrollment, the enrollment templates (e.g., static templates 216, shown in FIG. 6) are added to static portion 222 of template space 220. After the enrollment process and static templates 216 are added to static portion 222, process 300, shown in FIG. 15, may be used to add additional templates to template space 220. Additional templates may be added to dynamic portion 224 as dynamic templates 226 (e.g., a portion from which templates may be added and deleted without a device reset being needed). Dynamic templates 226 may be used in combination with static templates 216 in template space 220 for facial recognition authentication process 250, shown FIG. 7.

In certain embodiments, temporary templates 312 generated by process 300, shown in FIG. 15, are added to dynamic portion 224 as dynamic templates 226, shown in FIG. 6, when confidence score 332 for temporary template 312 is higher than a lowest confidence score of static templates 216 in static portion 222. Confidence score 334 may be equal to a lowest confidence score for static templates 216 in static portion 222 assessed during the same unlock attempts used to assess confidence score 332 for temporary template 312 (e.g., the confidence score for the template with the lowest number of successful unlock attempts during the same unlock attempts using temporary template 312). Confidence score 334 may be assessed using the same threshold used for confidence score 332 (e.g., threshold 326).

In certain embodiments, if, in 336, confidence score 332 is greater than confidence score 334, then temporary template 312 is added, in 338, as dynamic template 226 in dynamic portion 224. For example, if temporary template 312 has 45 successful unlock attempts out of 50 total unlock attempts while one static template 216 only has 40 successful unlock attempts out of the same 50 total unlock attempts, then temporary template 312 may be added to dynamic portion 224 as one of dynamic templates 226. If, in 336, confidence score 332 is less than confidence score 334, then temporary template 312 is ignored or deleted in 340. Temporary templates 312 may be added until a maximum number of allowed dynamic templates 226 are stored in dynamic portion 224.

Once dynamic portion 224 reaches its maximum number of dynamic templates 226 in dynamic portion 224, temporary template 312 may replace one of dynamic templates 226 in 338. For example, temporary template 312 may replace one of dynamic templates 226 if the temporary template is less of an outlier than one of dynamic templates 226. In certain embodiments, statistical analysis of the feature vectors that represent dynamic templates 226 and temporary template 312 is used to assess if temporary template 312 is less of an outlier than one of dynamic templates 226. Statistical analysis may include, for example, classification algorithms operated on feature vectors for the templates.

Figure 16:
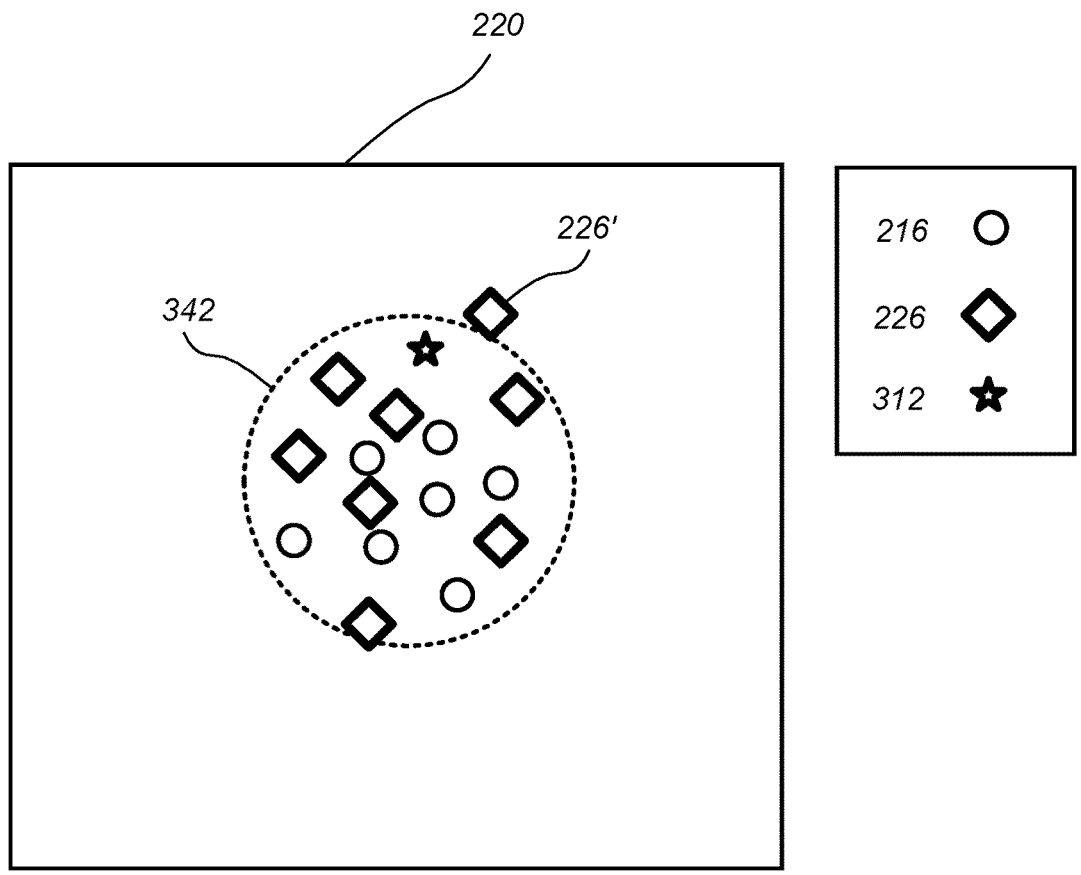
FIG. 16 depicts a representation of an embodiment of a template space represented as a feature space.

FIG. 16 depicts a representation of an embodiment of template space 220 represented as a feature space. In the feature space depiction of template space 220, static templates 216, dynamic templates 226, and temporary template 312 are represented by feature vectors. For example, static templates 216 are represented by circles, dynamic templates 226 are represented by diamonds, and temporary template 312 is represented by a star. In certain embodiments, as described above, static templates 216 are not allowed to be replaced by temporary template 312. Thus, if dynamic portion 224 has reached its maximum number of dynamic templates 226, temporary template 312 may replace one of dynamic templates 226 if temporary template 312 is less of an outlier than one of dynamic templates 226.

Statistical analysis of the feature vectors in the feature space correlating to template space 220 may generate a circle (e.g., circle 342) that most closely defines a maximum number of the feature vectors. As shown in FIG. 16, circle 342 defines the feature vector for dynamic template 226' as an outlier of the circle. The feature vector for dynamic template 226' is more of an outlier than the feature vector for temporary template 312. Thus, temporary template 312 may replace dynamic template 226' in template space 220. If temporary template 312 had been more of an outlier than each of dynamic templates 226, then the temporary template may not have replaced any one of dynamic templates 226.

In certain embodiments, when temporary template 312 replaces dynamic template 226' in template space 220, one or more thresholds for device 100 may be recalculated. As temporary template 312 is less of an outlier than dynamic template 226' recalculation of the threshold(s) may further restrict the thresholds (e.g., raise the threshold for matching scores to require closer matching). In some embodiments, the unlock threshold (e.g., unlock threshold 264, shown in FIG. 7) is made stricter when temporary template 312 replaces dynamic template 226' in template space 220. In some embodiments, a template update threshold (e.g., threshold 304, shown in FIG. 15) is made stricter when temporary template 312 replaces dynamic template 226' in template space 220.

Figure 17:
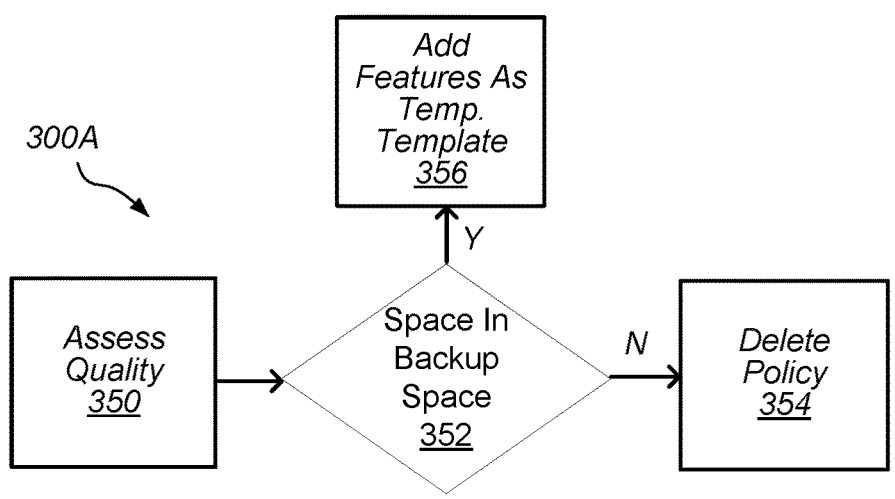
FIG. 17 depicts a flowchart of an embodiment of a template update sub-process.

FIG. 17 depicts a flowchart of an embodiment of template update sub-process 300A. As described above, sub-process 300A may proceed if matching score 260 is below threshold 304 but above unlock threshold 264. Images with matching scores 260 in such a range (above unlock threshold 264 and below threshold 304) may have more uncertainty in matching than images that are above threshold 304 (while still being able to unlock device 100). Thus, these more uncertain images may be processed using sub-process 300A.

In sub-process 300A, one or more qualities in the unlock attempt image are assessed in 350. Assessing qualities of the unlock attempt image in 350 may be substantially similar to assessing qualities in 306 and 308, as shown in FIG. 15. As shown in FIG. 17, if the unlock attempt image passes the assessment of qualities (e.g., meets qualifications) in 350, then a determination may be made in 352 if there is space (e.g., room) in the backup space used for temporary templates 312 to store another temporary template (e.g., a determination if a maximum number of temporary templates 312 are stored in the backup space).

If there is no room in the backup space ("N"), then the unlock attempt image (and its corresponding feature vectors) may be subject to delete policy 354, as shown in FIG. 17. In delete policy 354, the feature vector(s) in the backup space (e.g., space for temporary templates 312) that has selected redundancy (e.g., is most redundant) to the existing features may be replaced in the backup space.

If there is room in the backup space ("Y"), then the feature vectors for the unlock attempt image are added to the backup space as a temporary template (e.g., temporary template 312) in 356. Once the temporary template from sub-process 300A is added to the backup space in 356, the temporary template may be processed substantially as temporary template 312 (e.g., compared to additional unlock attempt images as shown in FIG. 15). In certain embodiments, the temporary template from sub-process 300A is used as a template (e.g., temporary template 312 and/or dynamic template 226) for a selected amount of time. For example, because the temporary template from sub-process 300A is originally added with a higher uncertainty than other templates, the amount of time allowed for use of the temporary template from sub-process 300A may be limited (e.g., the temporary template has a limited lifetime). In some embodiments, the selected amount of time is a maximum amount of successful unlock attempts using the temporary template from sub-process 300A.

As described above, first template update process 300 may be used to update an enrollment profile (e.g., templates in the template space) when device 100 is unlocked or accessed using facial authentication recognition process 250. First template update process 300 may be used, for example, to update the enrollment profile in response to gradual changes in a user's appearance (e.g., weight gain/loss).

In some embodiments, however, facial features of an authorized user (e.g., the user's facial appearance) may have changed drastically, or at least to a large enough extent, that the user may encounter difficulty unlocking or accessing features (e.g., operations) on device 100 using facial authentication recognition process 250, depicted in FIG. 7. Drastic or large extent changes in the user's facial appearance may include, for example, shaving of a beard or mustache, getting a large scar or other disfigurement to the face, making drastic changes in makeup, making drastic hair changes. In some cases, the user may also encounter difficulty in unlocking/accessing device 100 using facial authentication recognition process 250 if there was an error during the enrollment process and/or there are large differences between the user's environment during the unlock attempt and the time of enrollment. Encountering difficulty in unlocking device 100 using facial authentication recognition process 250 may be a frustrating experience for the user. When difficulty in unlocking device 100 using facial authentication recognition process 250 occurs due to the above described changes/issues, a second template update process (e.g., second template update process 400, described below) may be used to, at least temporarily, allow the user to unlock/access device using the facial authentication recognition process, despite the issues/changes, after verification of the user's identity using a second authentication protocol.

As shown in FIG. 7, the user may attempt a number of unlock attempts unsuccessfully using facial authentication recognition process 250 until the number of unsuccessful unlock attempts reaches the threshold in 270 and device 100 is locked from further attempts to use the facial authentication recognition process. At such time, the user may be presented with one or more options for proceeding with a different type of authentication to unlock or access features on device 100 in unlock options 274. After the user is successfully authenticated using the selected option, device 100 may, at least temporarily, update the user's enrollment profile (e.g., using second template update process 400 described below) to allow the user to be able to unlock/access the device in future unlock attempts using facial authentication recognition process 250 despite the changes in the user's facial appearance that previously prevented the user from using the facial authentication recognition process to unlock/access the device. Thus, the user, by successfully completing authentication using the selected option, may automatically be able to access device 100 using facial authentication recognition process 250 in future unlock attempts for at least a short period of time.

Figure 18:
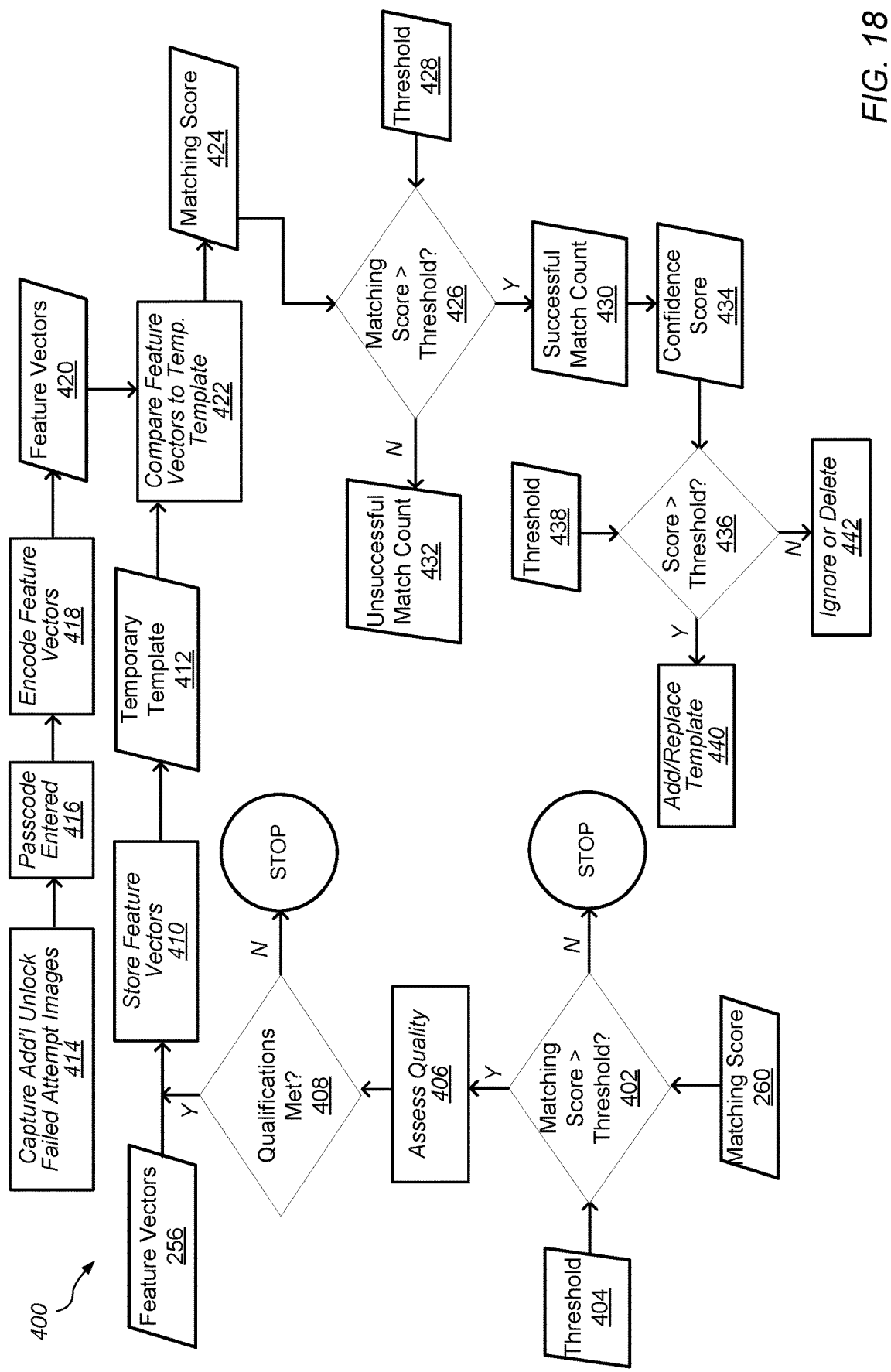
FIG. 18 depicts a flowchart of an additional embodiment of a template update process.

FIG. 18 depicts a flowchart of an embodiment of second template update process 400. Process 400 may be used when facial recognition authentication process 250 is unable to unlock device 100 but the device is unlocked using a passcode or other authentication protocol, as shown in FIG. 7. In some embodiments, process 400 may be used when device 100 is unlocked using the passcode immediately after the unlock attempt fails or within a specified time frame after the unlock attempt fails (e.g., in temporal proximity to the unlock attempt). In certain embodiments, process 400 is used to update template space 220 for a single enrollment profile (e.g., the enrollment profile used in process 250) on device 100. If multiple enrollment profiles are on device 100, process 400 may be operated on only the enrollment profile that is the closest match to the feature vectors from the captured unlock attempt image (as described herein).

In certain embodiments, process 400 is used to update template space 220 for the enrollment profile when facial features of the authorized user have changed to an extent that prevents feature vectors generated from an unlock attempt image (e.g., feature vectors 256) from being close enough (e.g., within the unlock threshold distance) to static templates 216 and/or dynamic templates 226 to allow device 100 to be unlocked using facial recognition authentication process 250, shown in FIG. 7. For example, process 400 may be used for feature vector 256B, which is depicted outside circle 265 (the unlock threshold circle) in FIG. 5. Possible causes for the user to be able to unlock device 100 using facial recognition authentication process 250 include, but are not limited to, if the authorized user shaves a beard or mustache, gets a large scar or other disfigurement to the face, large changes in makeup, drastic hair change, or has another severe change in a facial feature, these changes may be immediate changes or "step changes" in the facial features of the authorized user that do not allow first template update process 300 to update template space 220 gradually over time.

Second template update process 400 may begin by assessing in 402 if matching score 260 is above threshold 404. Threshold 404 may be a threshold score for determining if feature vector(s) 256 are similar (e.g., close) enough to feature vectors 210 (from static templates 216) that feature vector(s) 256 may potentially be used as another template. In certain embodiments, threshold 404 for process 400 is below unlock threshold 264. Threshold 404 may be below unlock threshold 264 (e.g., more distance allowed between feature vectors and the templates) because the passcode (or other authentication) has been entered prior to beginning process 400. Thus, the threshold for feature vector(s) 256 becoming a template in process 400 may be less strict than the threshold for unlocking the device and the threshold for process 300, shown in FIG. 15. Threshold 404 may, however, be set at a value that sets a maximum allowable distance between feature vectors 256 for the unlock attempt image and feature vectors for template space 220. Setting the maximum allowable distance may be used to prevent a user that is not the authorized user but has the passcode for device 100 to be enabled for facial recognition authentication on the device. Threshold 404 may be set during manufacturing and/or by the firmware of device 100. Threshold 404 may be updated (e.g., adjusted) by device 100 during operation of the device as described herein (e.g., after templates are added or replaced in template space 220).

Process 404 may be stopped and feature vector(s) 256 are deleted from device 100 if matching score 260 is below threshold 404. If matching score 260 is above threshold 404, then process 400 is continued. In some embodiments, after assessing 404, one or more qualities in the unlock attempt image are assessed in 406. For example, pose (e.g., pitch, yaw, and roll of the face), occlusion, attention, field of view, and/or distance in the unlock attempt image may be assessed in 406. In some embodiments, pose and/or occlusion in the unlock attempt image are assessed using the landmark and/or occlusion maps described herein. In 408, if suitable qualifications (as described above) are not met, then process 400 may be stopped.

If suitable qualifications are met in 408, then process 400 continues in 410 with storing feature vector(s) 256 in a backup space in the memory of device 100. The backup space in the memory for process 400 may be a different backup space than used for process 300. For example, the backup space in the memory for process 400 may be a temporary space in the memory that includes readable/writable memory partitioned from backup space used for process 300. Feature vector(s) 256 may be stored in the memory as temporary template 412.

In certain embodiments, after temporary template 412 is stored in the backup space, temporary template 412 may be compared to feature vectors for additional images from failed facial recognition authentication unlock attempts of device 100. For example, in process 400 additional unlock failed attempt images may be captured in 414. If the correct passcode is entered in 416, then feature vectors for the images captured in 414 may be encoded in 418 to generate feature vectors 420.

In certain embodiments, in 422, feature vectors 420 are compared to the feature vector(s) for temporary template 412. Comparison of feature vectors 420 and the feature vector(s) for temporary template 412 may provide matching score 424. Matching score 424 may be compared in 426 to threshold 428. Threshold 428 may be, for example, a similarity threshold or a threshold that defines at least a minimum level of matching between the feature vector(s) for temporary template 412 and feature vectors 420 obtained from the additional images from failed facial recognition authentication attempts that are followed by entering of the passcode for device 100. Thus, threshold 428 may be set at a value that ensures at least a minimum amount of probability that the change in the user's features that caused the failed unlock attempt and generated temporary template 412 is still present in the images from additional failed unlock attempts using facial recognition authentication.

If matching score 424 is above threshold 428 in 426, then a successful match is counted in 430. If matching score 424 is below threshold 428 in 426, then an unsuccessful match is counted in 432. Counts 430 and 432 may be continued until a desired number of failed unlock attempts are made using facial recognition authentication (e.g., a desired number of comparisons of matching score 424 and threshold 428). Once the desired number of attempts is made, the number of successful matches in 430 out of the total number of failed unlock attempts (e.g., the sum of counts 430 and 432) may be used to assess confidence score 434 for temporary template 412. For example, there may be 18 successful matches (e.g., comparisons) of matching score 424 and threshold 428 out of 20 total failed unlock attempts. Confidence score 434 may be used to assess whether or not template 412 is added as dynamic template 226 to template space 220 for the enrollment profile, shown in FIG. 6.

In some embodiments, it may be assumed that if a step change occurs in the facial features of the authorized user, the step change may remain for a number of successive unlock attempts using facial recognition authentication. For example, if the user shaved a beard, then the step change should remain for at least some length of time (e.g., at least a week). In such embodiments, if a successful unlock attempt (or a desired number of successful unlock attempts) using facial recognition authentication occurs before a selected number of successive unlock attempts is reached (e.g., 10 or 15 unlock attempts), then temporary template 412 may be deleted from the backup space in the memory. In some embodiments, the assumption that the step change may remain for a number of successive unlock attempts may not apply (e.g., if the user's step change was due to temporary application of makeup).

In certain embodiments, in 436, confidence score 434 is compared against threshold 438 to assess if the confidence score is greater than the threshold. Threshold 438 may be a threshold selected to ensure a minimum number of successful comparisons of matching score 424 and threshold 428 are reached before allowing template 412 to be added to template space 220. In 436, if confidence score 434 is greater than threshold 438, then, in 440, temporary template 412 may be added to template space 220 or temporary template 412 may replace a template in the template space 220 (e.g., replace one of dynamic templates 226). If confidence score 434 is less than threshold 438, then temporary template 412 may be ignored or deleted in 442.

As described above, temporary template 412 generated by process 400 may be added to dynamic portion 224 of template space 220 for the enrollment profile as one of dynamic templates 226, shown in FIG. 6. For process 400, shown in FIG. 18, the passcode (or other authentication) has been used to verify that temporary template 412 is for the authorized user. Thus, in certain embodiments, temporary template 412 is added to template space 220 in 440 without a need for comparison to dynamic templates 226 already in dynamic portion 224. If the maximum number of allowed dynamic templates 226 in dynamic portion 224 has not been reached, then temporary template 412 is added to the dynamic portion as one of dynamic templates 226.

If the maximum number of allowed dynamic templates 226 in dynamic portion 224 has been reached, then temporary template 412 may replace one of dynamic templates 226 in the dynamic portion. As the passcode (or other authentication) has been used to verify temporary template 412 is for the authorized user, the temporary template may replace one of dynamic templates 226 in dynamic portion 224 even if the temporary template is more of an outlier than each of dynamic templates 226. In certain embodiments, temporary template 412 replaces the largest outlier of dynamic templates 226 regardless of the relative lie (e.g., outlie) of the temporary template. In some embodiments, temporary template 412 may replace a dynamic template that is redundant (e.g., most redundant) to the existing dynamic templates even if the temporary template is more of an outlier than each of the dynamic templates.

Figure 19:
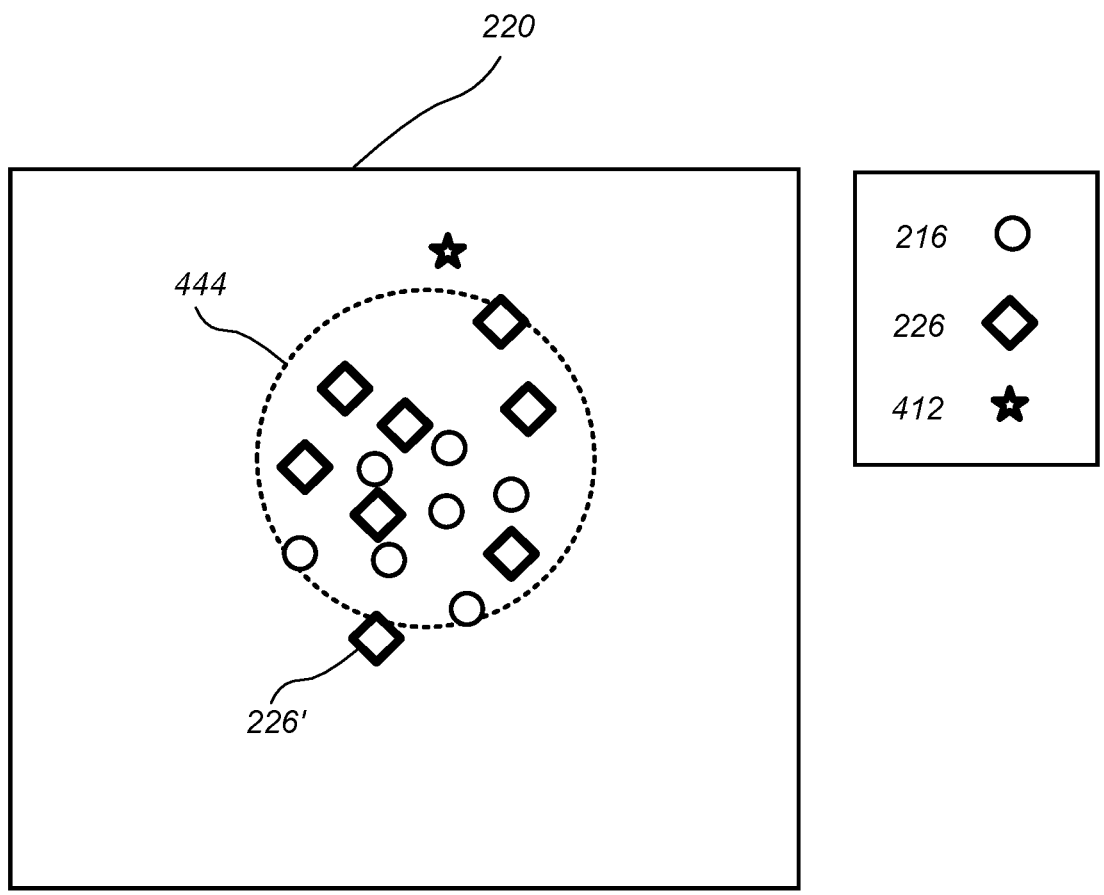
FIG. 19 depicts a representation of an additional embodiment of a template space represented as a feature space.

FIG. 19 depicts a representation of an embodiment of template space 220 represented as a feature space with a feature vector for temporary template 412. In the feature space depiction of template space 220 in FIG. 19, static templates 216, dynamic templates 226, and temporary template 412 are represented by feature vectors. Static templates 216 are represented by circles, dynamic templates 226 are represented by diamonds, and temporary template 412 is represented by a star. As described above, static templates 216 may not be replaced by temporary template 412. Thus, if dynamic portion 224 has reached its maximum number of dynamic templates 226, temporary template 412 may replace one of dynamic templates 226.

Statistical analysis of the feature vectors in the feature space correlating to template space 220 may generate a circle (e.g., circle 444) that most closely defines a maximum number of the feature vectors. As shown in FIG. 19, the feature vector for dynamic template 226' is the largest outlier of each of the feature vectors for dynamic templates 226. Thus, temporary template 412 may replace dynamic template 226' in template space 220 regardless of the position of the feature vector for the temporary template. In the example depicted in FIG. 19, the addition of the feature vector for temporary template 412 shifts circle 444 towards the feature vector for temporary template 412 and may cause the feature vector for dynamic template 226' to become the largest outlier of the circle. In some embodiments, when temporary template 412 replaces dynamic template 226' in template space 220, one or more thresholds for device 100 may be recalculated.

In some embodiments, a temporary template (e.g., either temporary template 312 or temporary template 412) may be used to unlock device 100 for a selected period of time while the temporary template is in the backup space of the memory (e.g., before the temporary template is added to template space 220). The temporary template may be used to unlock device 100 after the passcode (or other user authentication protocol) is used in combination with the temporary template. For example, for temporary template 412, the passcode has been entered to unlock device 100 before temporary template 412 is generated and stored in the backup space of the device memory. Temporary template 412 may then be used to allow unlocking of device 100 using facial recognition authentication for a selected time period (e.g., a few days or a week). After the selected time period expires, if temporary template 412 has not been added to template space 220, the user may be prompted for the passcode if facial recognition authentication of the user fails.

In certain embodiments, one or more process steps described herein may be performed by one or more processors (e.g., a computer processor) executing instructions stored on a non-transitory computer-readable medium. For example, process 200, process 250, process 300, process 400, process 700, process 750, and process 800, shown in FIGS. 4, 7, 8, 12, 13, 15, and 18, may have one or more steps performed by one or more processors executing instructions stored as program instructions in a computer readable storage medium (e.g., a non-transitory computer readable storage medium).

Figure 20:
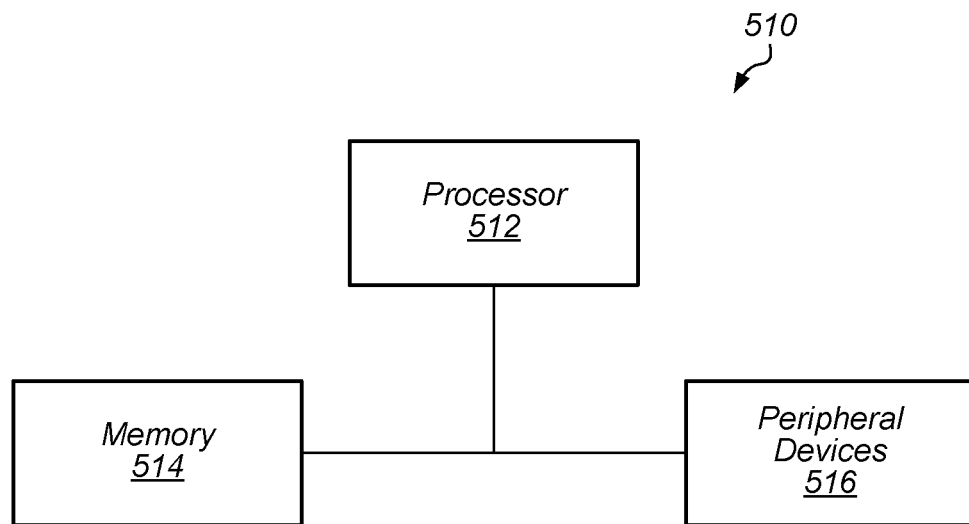
FIG. 20 depicts a block diagram of one embodiment of an exemplary computer system.

FIG. 20 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, process 250, process 300, and process 400, process 700, process 750, and process 800, shown in FIGS. 4, 7, 8, 12, 13, 15, and 18. In the embodiment of FIG. 20, computer system 510 includes processor 512, memory 514, and various peripheral devices 516. Processor 512 is coupled to memory 514 and peripheral devices 516. Processor 512 is configured to execute instructions, including the instructions for process 200, process 250, process 300, process 400, process 700, process 750, and/or process 800, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 21:
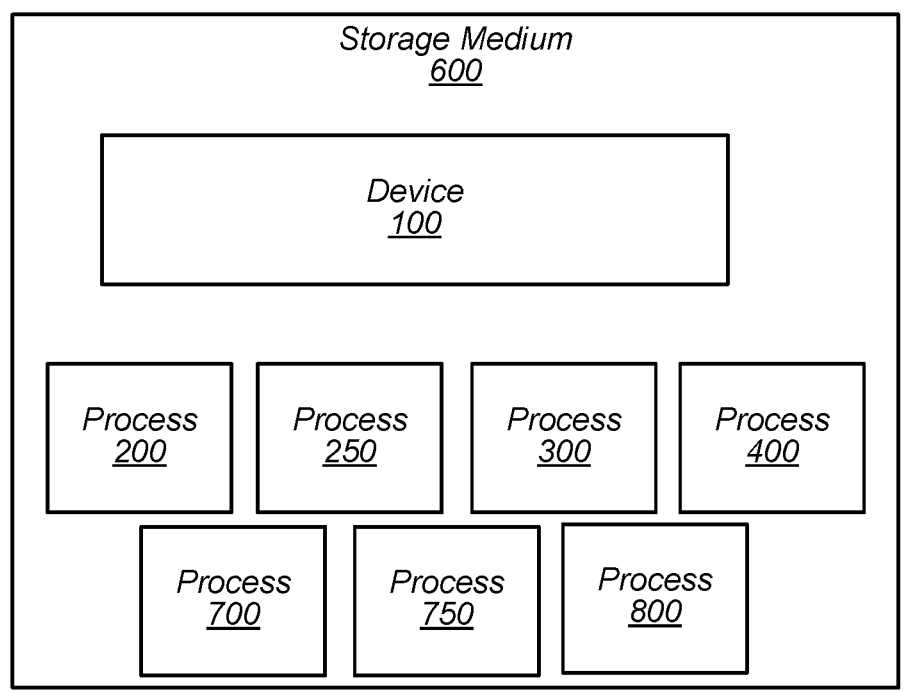
FIG. 21 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 21, other input/output (I/O) devices such as video hardware, audio hardware, user interface devices, networking hardware, etc.).

Turning now to FIG. 21, a block diagram of one embodiment of computer accessible storage medium 600 including one or more data structures representative of device 100 (depicted in FIG. 1) included in an integrated circuit design and one or more code sequences representative of process 200, process 250, process 300, process 400, process 700, process 750, and/or process 800 (shown in FIGS. 4, 7, 8, 12, 13, 15, and 18). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

As described herein, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
    installing a second authentication algorithm in a computer processor on a device having a first authentication algorithm, the device comprising a camera, the computer processor, and a memory;
    operating a first facial recognition authentication process, using the first authentication algorithm, for a period of time on the device, wherein the first facial recognition authentication process includes:
        capturing a plurality of unlock attempt images of a user using the camera located on the device over the period of time;
        determining whether the user in the captured unlock attempt images is an authorized user of the device based on a comparison of facial features of the user in the captured images to one or more enrollment templates by the first authentication algorithm; and
        authorizing the user to perform at least one operation on the device that requires authentication in response to determining the user in the captured unlock attempt images is the authorized user of the device;
    generating at least one second template by operating the second authentication algorithm on at least one of the captured unlock attempt images that successfully authorizes the user to perform the at least one operation on the device;
    operating a second facial recognition authentication process using the second authentication algorithm for the period of time on the device, wherein the second facial recognition authentication process operates using the at least one second template generated by the second authentication algorithm, and wherein the second facial recognition authentication process includes determining whether the user in the captured unlock attempt images is the authorized user of the device based on a comparison of the facial features of the user in the captured unlock attempt images to the at least one second template generated by the second authentication algorithm;
    assessing a performance of the second facial recognition authentication process with respect to a performance of the first facial recognition authentication process for determining whether the user in the captured unlock attempt images is the authorized user of the device over the period of time;
    switching, after the period of time, from using the first authentication algorithm to using the second authentication algorithm in the first facial recognition authentication process for authorizing the user to perform the at least one operation on the device that requires authentication in response to the performance of the second facial recognition authentication process being assessed to meet one or more selected performance criteria with respect to the performance of the first facial recognition authentication process; and
    after switching from using the first authentication algorithm to using the second authentication algorithm in the first facial recognition authentication process for authorizing the user to perform at least one operation on the device that requires authentication:
        operating the first facial recognition authentication process, using the second authentication algorithm, to authorize the user to perform at least one operation on the device that requires authentication based on a comparison of the facial features of the user in at least one subsequently captured unlock attempt image tothe at least one second template generated by the second authentication algorithm.

2. The method of claim 1, wherein the at least one second template used in the first facial recognition authentication process after switching from using the first authentication algorithm to using the second authentication algorithm in the first facial recognition a uthentication process comprises a median template selected from a plurality of second templates generated by the second authentication algorithm for a plurality of the captured unlock attempt images that successfully authorize the user to perform the at least one operation on the device.

3. The method of claim 1, wherein the performance of the second facial recognition authentication process with respect to the performance of the first facial recognition authentication process is determined using the same captured unlock attempt images of the user.

4. The method of claim 1, wherein operating the first facial recognition authentication process for the period of time comprises:
    encoding at least one of the captured unlock attempt images to generate at least one unlock attempt feature vector, wherein the unlock attempt feature vector represents the facial features of the user in the at least one captured unlock attempt image;
    comparing the unlock attempt feature vector to the enrollment templatesto obtain a matching score; and
    authorizing the user to perform the at least one operation on the device that requires authentication in response to determining the matching score is above an unlock threshold of the device.

5. The method of claim 1, wherein operating the second facial recognition authentication process for the period of time comprises:
    encoding at least one of the captured unlock attempt images to generate at least one unlock attempt feature vector, wherein the unlock attempt feature vector represents the facial features of the user in the at least one captured unlock attempt image;

comparing the unlock attempt feature vector to the at least one second template generated by the second authentication algorithm to obtain a matching score; and assessing the performance of the second facial recognition authentication process in response to a comparison of the matching score to an unlock threshold of the device.

6. The method of claim 1, wherein assessing the performance of the second facial recognition authentication process with respect to the performance of the first facial recognition authentication process comprises assessing acceptance rates and rejection rates of images obtained by the camera during attemptsto authorize the user in the captured unlock attempt images over the period of time.

\* \* \* \* \*

UNITED STATES PATENT AND TRADEMARK OFFICE
CERTIFICATE OF CORRECTION

PATENT NO. : 11,527,107 B1  
APPLICATION NO. : 16/457811  
DATED : December 13, 2022  
INVENTOR(S) : Eslam A. Mostafa et al.

Page 1 of 1

It is certified that error appears in the above-identified patent and that said Letters Patent is hereby corrected as shown below:

In the Claims

Column 35, Line 55, delete "imagesthat" and insert --images that--

Column 36, Line 31, delete "tothe" and insert --to the--

Column 36, Line 37, delete "a uthentication" and insert --authentication--

Column 36, Line 57, delete "templatesto" and insert --templates to--

Column 37, Line 14, delete "attemptsto" and insert --attempts to--

Signed and Sealed this  
Twenty-third Day of May, 2023

Katherine Kelly Vidal  
*Director of the United States Patent and Trademark Office*